US008246157B2

(12) United States Patent
Shino et al.

(10) Patent No.: US 8,246,157 B2

(45) Date of Patent: Aug. 21, 2012

(54) PRINTING METHOD, PRINTING APPARATUS, AND PRINTED DOCUMENT

(75) Inventors: Yoshiyuki Shino, Yokohama (JP); Kunitoshi Hayashi, Hachioji (JP); Yuko Suga, Tokyo (JP); Akira Hirasawa, Hino (JP); Kumiko Nonaka, Sagamihara (JP); Jin Okutsu, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1144 days.

(21) Appl. No.: 12/114,386

(22) Filed: May 2, 2008

(65) Prior Publication Data

US 2009/0033730 A1 Feb. 5, 2009

(30) Foreign Application Priority Data

May 8, 2007 (JP) ................................ 2007-123583

(51) Int. Cl.

| | |
|---|---|
| ***B41J 2/01*** | (2006.01) |
| ***B05D 5/10*** | (2006.01) |
| ***C08J 7/04*** | (2006.01) |
| ***B32B 3/00*** | (2006.01) |
| ***B32B 5/16*** | (2006.01) |
| ***B32B 7/00*** | (2006.01) |

(52) U.S. Cl. ..................... 347/102; 427/208.6; 427/511; 428/174

(58) Field of Classification Search ........................ None
See application file for complete search history.

(56) References Cited

U.S. PATENT DOCUMENTS 6,130,024 A * 10/2000 Aylward et al. ............... 430/256
2006/0203024 A1 9/2006 Kusunoki

FOREIGN PATENT DOCUMENTS

| | | |
|---|---|---|
| EP | 1 712 603 | 10/2006 |
| JP | 9-58118 | 3/1997 |
| JP | 11-48651 | 2/1999 |
| JP | 11-334201 | 12/1999 |
| JP | 2001-262105 | 9/2001 |
| JP | 2004-090593 | 3/2004 |

* cited by examiner

*Primary Examiner* — Matthew Luu
*Assistant Examiner* — Renee I Wilson
(74) *Attorney, Agent, or Firm* — Fitzpatrick, Cella, Harper & Scinto

(57) ABSTRACT

The present invention relates to a printing method, a printing apparatus, and a printed document by which an ink offset can be prevented while securing a sufficient adhesion force of the pressure-sensitive adhesive layer. Ink is applied so that, when ink applied to a pressure-sensitive adhesive layer of a pressure-sensitive adhesive sheet cures, a convex section of the pressure-sensitive adhesive layer exposed out of the curried ink, thereby printing an image.

9 Claims, 16 Drawing Sheets

PRINTING METHOD, PRINTING APPARATUS, AND PRINTED DOCUMENT

BACKGROUND OF THE INVENTION

1. Field of the Invention

The present invention relates to a printing method, a printing apparatus, and a printed document as a resulting printed matter by which liquid ink is applied to a pressure-sensitive adhesive layer of a pressure-sensitive adhesive sheet including minute concave section and convex section to print an image.

In particular, the present invention relates to preferred printing method, printing apparatus, and printed document as a resulting printed matter used to print an image on a superposed surface as an information-supporting face of an information-supporting sheet. The information-supporting sheet includes, for example, a folded sheet in which a superposed surface obtained by folding or a cutting is used as the information-supporting face, an information communication sheet having confidentiality like the one provided by a superposed sheet, or an information communication sheet such as an organizing sheet that can have an enlarged size.

2. Description of the Related Art

In the information-supporting sheet in which information is supported by superposed surfaces of a superposed base sheet, the superposed surfaces generally have thereon pressure-sensitive adhesive layers of pressure-sensitive adhesive agent so that the superposed surfaces can be adhered to each other in a peelable manner. The pressure-sensitive adhesive layers are formed on the entire face or a specific part of the surfaces to be superposed, and are formed in a predetermined pattern or linear form so that the pressure-sensitive adhesive layers can be opposed to each other when the surfaces are superposed together. This pressure-sensitive adhesive agent is also called as autohesion pressure-sensitive adhesive agent. When the pressure-sensitive adhesive layers made of pressure-sensitive adhesive agent are strongly pressurized to each other, polymers in these pressure-sensitive adhesive layers adhere to one another by the self-diffusion. By selecting the type of composition or the level of pressurization of the pressure-sensitive adhesive agent, permanent adhesiveness or peelable adhesiveness is achieved. The information-supporting sheet having a peelable superposed surface also may be called as a "pressure-sensitive adhesive sheet" hereinafter.

Recently, the inkjet printing method has been increasingly used as a method to print an address, a name, and individual information on the superposed surface of the pressure-sensitive adhesive sheet. In particular, the diffusion of color ink has enabled a high-level color printing (process printing) equal to a conventional printmaking technique.

In the pressure-sensitive adhesive sheet as described above, the superposed surfaces on which information is printed are adhered to each other by the pressure-sensitive adhesive layer to subsequently peel these superposed surfaces. This peeling process has caused some cases where information printed on one superposed surface is transferred onto the other superposed surface (hereinafter referred to as "ink offset"). Such an ink offset also may be caused in the use of the inkjet printing method. When ink used for the inkjet printing method is water-soluble dye ink, a printed image may have an insufficient water resistance.

In order to prevent them, Japanese Patent Laid-Open No. 11-48651, Japanese Patent Laid-Open No. 11-334201, and Japanese Patent Laid-Open No. 09-058118 suggest a method to add a cationic compound to the pressure-sensitive adhesive layer of the pressure-sensitive adhesive sheet used for the inkjet printing method and a method to use ink including pigment having a superior water resistance as a main component for example.

However, even the methods as described above find it difficult to prevent the ink offset. Thus, when ink including a pigment having a superior water resistance as a main component is used, the ink offset is more apparent. The addition of a cationic compound also has caused some cases where the pressure-sensitive adhesive layer is caused to include gel-like coating liquid, preventing the coating of the coating liquid. Another problem is that a wet offset printing may cause the elution of cation resin to cause a dirty printing plate.

SUMMARY OF THE INVENTION

The present invention provides a printing method and a printing apparatus, and a printed document by which the ink offset can be prevented while providing the pressure-sensitive adhesive layer with a sufficient adhesion force.

In the first aspect of the present invention, there is provided a printing method for applying liquid ink to a pressure-sensitive adhesive layer of a pressure-sensitive adhesive sheet including a minute concave section and a minute convex section to print an image, comprising a step of applying the liquid ink so that, when the liquid ink applied to the pressure-sensitive adhesive layer cures, the convex section of the pressure-sensitive adhesive layer is exposed out of the cured ink to print the image.

In the second aspect of the present invention, there is provided a printing apparatus for applying liquid ink to a pressure-sensitive adhesive layer of a pressure-sensitive adhesive sheet including a minute concave section and a minute convex section to print an image, comprising an ink application unit that applies the liquid ink so that, when the liquid ink applied to the pressure-sensitive adhesive layer cures, the convex section of the pressure-sensitive adhesive layer is exposed out of the cured ink to print the image.

In the third aspect of the present invention, there is provided a printed document on which an image is printed by applying liquid ink to the pressure-sensitive adhesive layer of a pressure-sensitive adhesive sheet including a minute concave section and a minute convex section, wherein when the liquid ink cures, the convex section of the pressure-sensitive adhesive layer are exposed out of the cured ink.

According to the present invention, the ink is applied in order to print an image such that, when the ink applied to the pressure-sensitive adhesive layer of the pressure-sensitive adhesive sheet cures, the convex section of the pressure-sensitive adhesive layer is exposed out of the cured ink. This can prevent the ink offset while providing the pressure-sensitive adhesive layer with a sufficient adhesion force. Furthermore, the ink cured within the concave section of the pressure-sensitive adhesive layer can suppress the reduction in the reflection of the printed image while maintaining the adhesiveness of the pressure-sensitive adhesive layer. In addition to this, a printed document can be prepared that shows less image bleeding even under an environment having a high temperature and high humidity for example and that has superior storage stability.

Furthermore, the inkjet printing head can be used to use a relatively small thermal energy to eject ink to apply the ink in a noncontact manner, thus eliminating a risk of the deteriorated adhesiveness of the pressure-sensitive adhesive layer. In this case, the active energy ray-curable and water-based ink such as the ultraviolet ray-curable ink can be used for example to provide an inkjet printing method and an inkjet printing apparatus having superior maintenance. Furthermore, the use of the active energy ray-curable and water-based ink can print, through the inkjet printing method, an image even on a part of the pressure-sensitive adhesive sheet having no pressure-sensitive adhesive layer.

Further features of the present invention will become apparent from the following description of exemplary embodiments (with reference to the attached drawings).

DESCRIPTION OF THE EMBODIMENTS

The following section will describe embodiments of the present invention with reference to the drawings.

(Pressure-Sensitive Adhesive Sheet)

Figure 1A:
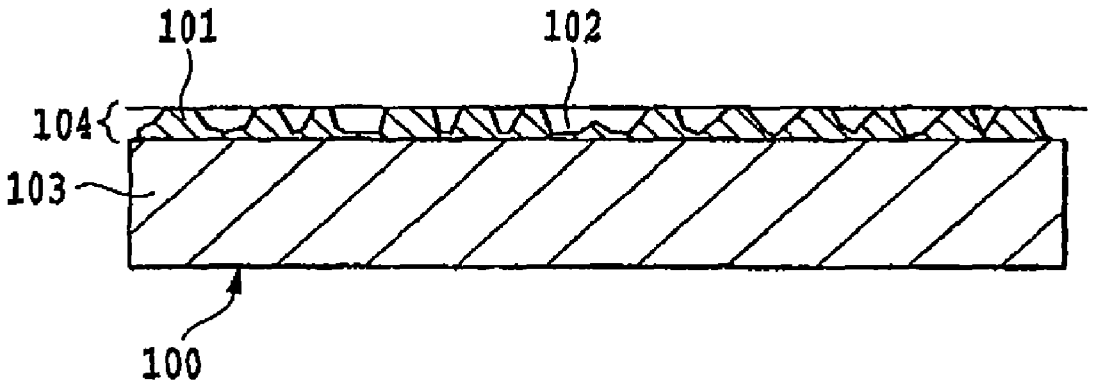
FIG. 1A is a cross-sectional view illustrating a configuration example of a pressure-sensitive adhesive sheet of the present invention.
Figure 1B:
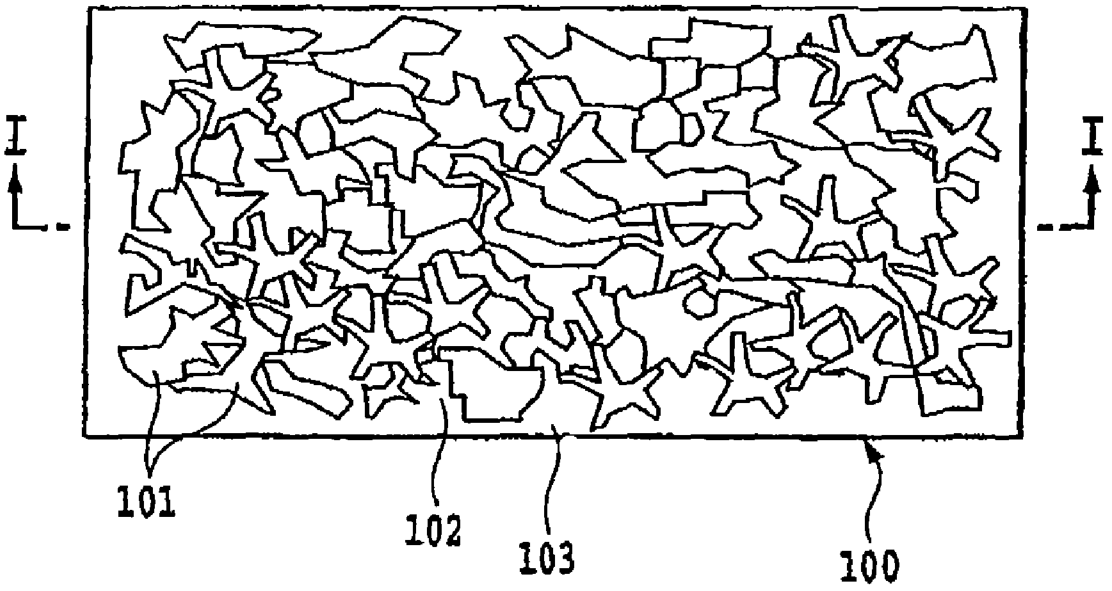
FIG. 1B is a top view illustrating the pressure-sensitive adhesive sheet of the present invention.
Figure 15:
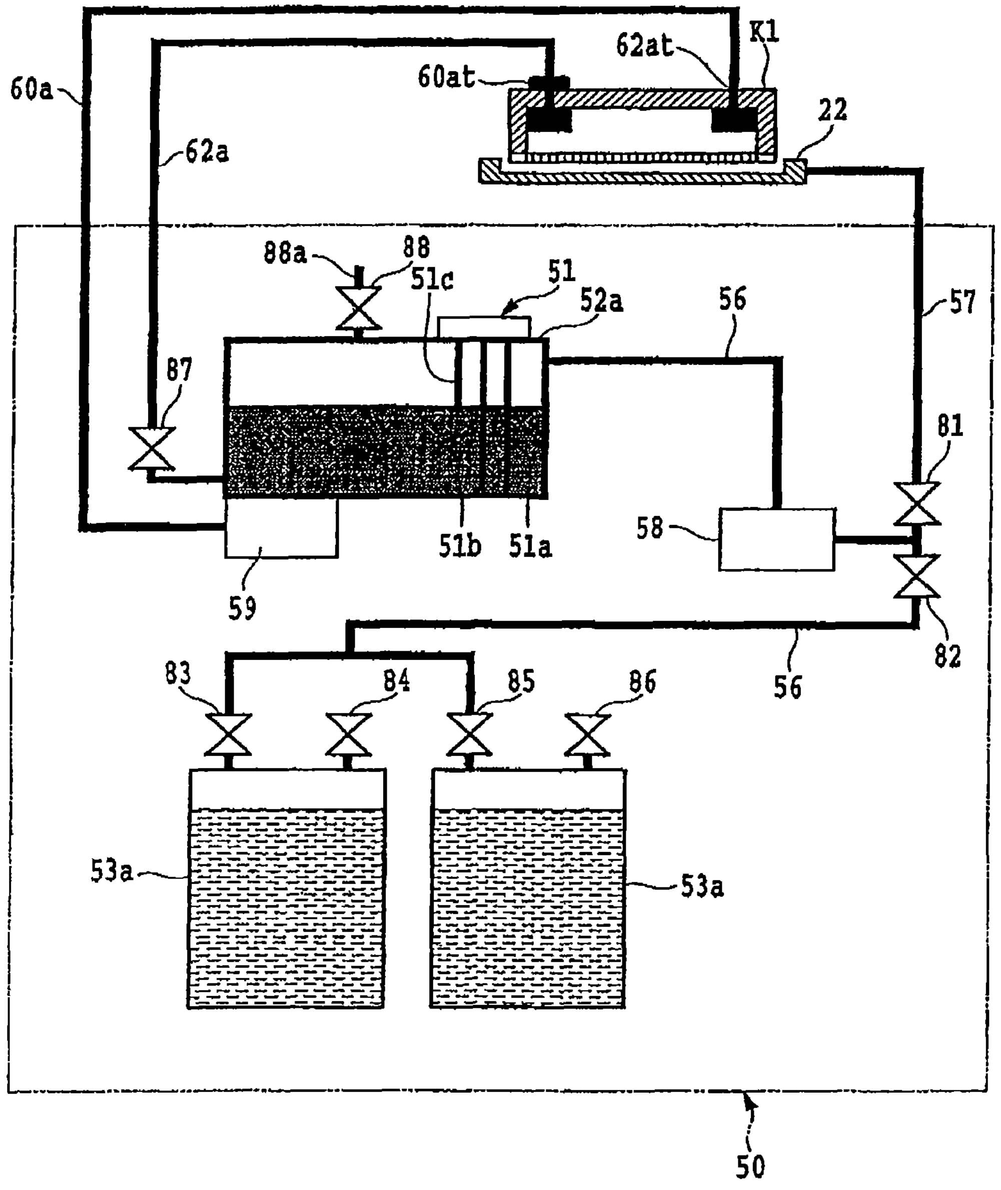
FIG. 15 illustrates an ink flow path in the print module of FIG. 14.

FIG. 1A and FIG. 1B are schematic views illustrating the configuration example of a pressure-sensitive adhesive sheet 100 of the present invention. FIG. 1A is a cross-sectional view illustrating the pressure-sensitive adhesive sheet 100. FIG. 15 is a top view illustrating the pressure-sensitive adhesive sheet 100. FIG. 1A is a cross-sectional view taken along the line I-I of FIG. 1B.

The pressure-sensitive adhesive sheet 100 of this example is structured so that a base member 103 has thereon a layer 104 of pressure-sensitive adhesive agent (the pressure-sensitive adhesive layer) and the pressure-sensitive adhesive layer 104 includes convex sections 101 and concave sections 102. The pressure-sensitive adhesive layer 104 is formed by applying pressure-sensitive adhesive agent onto the base member 103 by coating for example. The convex sections 101 are formed so as to have a close contact with the base member 103 and are independently sprinkled or are partially connected to one another. The convex sections 101 are partially connected to one another on the base member 103. The concave sections 102 are continuous to draw a groove-like pattern between the convex sections 101 or are individually divided.

In the normal status, the pressure-sensitive adhesive layers 104 are not adhered to each other. When a predetermined pressure is applied to the pressure-sensitive adhesive layers 104 opposed to each other, the pressure-sensitive adhesive layers 104 are adhered to each other in a peelable manner. The pressure-sensitive adhesive layer 104 is not limited to a particular type so long as the pressure-sensitive adhesive layer 104 can achieve the function as described above.

The pressure-sensitive adhesive sheet of this example is structured so that one face of the base member 103 has thereon the pressure-sensitive adhesive layer 104. A pattern forming method to form the convex sections 101 at the surface of the pressure-sensitive adhesive layer 104 is not limited to the particular one. For example, a method can be used in which the pressure-sensitive adhesive layer 104 is formed on the base member 103 to subsequently use an embossed roll or the like to perform the pattern forming processing. Alternatively, it is also possible to select the shape of the embossed roll to perform the pattern forming so that a side face of the concave section 102 of the pressure-sensitive adhesive layer 104 forms an inclined surface. The surface of the pressure-sensitive adhesive layer 104 subjected to the pattern forming processing preferably has a ten point average roughness (Rz) of 30 μm to 100 μm measured by a sensing pin-type surface roughness measuring instrument specified by JIS-B-0651 at a cutoff value of 0.8 mm specified by JIS-B-0601. A value of Rz lower than 30 μm may cause a printed image to be fixed to the surface of the pressure-sensitive adhesive layer 104, which tends to cause the ink offset. A value of Rz exceeding 100 μm causes ink ton sink in the concave section 102 formed among the plurality of convex sections 101, which tends to cause uneven density or white spot in the printed image.

Due to the above reason, prior to an image printing stage, the surface of the pressure-sensitive adhesive layer 104 preferably has the ten point average roughness (Rz) in a range from 30 μm to 100 μm at the cutoff value of 0.8 mm. Furthermore, a ratio Rz'/Rz between Rz and the ten point average roughness (Rz') after the image printing stage is preferably in a range from 0.3 to 0.9.

The percentage of the area of the convex section 101 to the total area of the pressure-sensitive adhesive layer 104 is preferably in a range from 30% to 80%. The percentage smaller than 30% causes a deteriorated adhesion force to cause a risk where the adhered pressure-sensitive adhesive layers peel from each other easily. The percentage exceeding 80% causes an excessively-strong adhesion force to cause a broken base member when the adhered pressure-sensitive adhesive layers are peeled to cause a risk of damage in printed information. The area of the convex section 101 means the area of the uppermost face of the convex section 101 when the surface of the pressure-sensitive adhesive layer 104 is seen from the top in the vertical direction.

When the inkjet printing method is used to use aqueous ink to print information on the pressure-sensitive adhesion sheet as described above, the pressure-sensitive adhesive layer of the pressure-sensitive adhesive sheet preferably has a contact angle to water of 90 degrees or less. Thus, the ink offset can be avoided effectively. The contact angle less than 90 degrees causes an insufficient amount of ink sunk in the concave section, which tends to cause the ink offset when the pressure-sensitive adhesive layers are compressed and peeled. The contact angle is an angle at an intersecting point of the surface of aqueous droplets placed on the pressure-sensitive adhesive layer and the pressure-sensitive adhesive layer that is formed by the tangent line to aqueous droplets and the pressure-sensitive adhesive layer. The smaller this angle is, the higher wettability to aqueous ink is. The value of the contact angle in the present invention is obtained by a measurement method as described below. Specifically, a pressure-sensitive adhesive paper including the pressure-sensitive adhesive layer was left in an environment of 23 degrees C. and 50% RH for 12 hours to subsequently drip purified water on the pressure-sensitive adhesive layer. Then, in a range within which the fluid volume does not change (a range within which liquid droplets are not absorbed by the pressure-sensitive adhesive layer and are not evaporated), the contact angle when the spread of liquid droplets was maximum (after the 0.1 to 60 seconds after the dripping) was measured by a contact angle measurement tool. This measurement was carried out by an automatic contact angle measurement tool CA-VP (made by Kyowa Interface Science Co., Ltd.).

The base member 103 used for the pressure-sensitive adhesive sheet 100 is not limited to the particular one. For example, the base member 103 may be a noncoated paper such as a high-quality paper, a medium quality paper, a rough paper, a cotton paper, a coated paper such as an art paper, a coated paper, a light-weight coated paper, a resin-coated paper, cloth, a plastic laminate cloth, a plastic film, or a metal foil. The base member generally may have a basis weight of about 56 to 160 g/m$^2$. When the base members are a synthetic plastic film of a resin-covered paper, polyethylene, polypropylene, polyethylene terephthalate, or polyvinyl chloride, the surfaces of the base member are preferably subjected to an easy-adhesion processing by corona discharge for example. The coating thickness of the pressure-sensitive adhesive layer on the surface of the base after a drying step is not limited to the particular one. For example, the coating thickness is preferably in a range from 1 μm to 20 μm in order to allow the pressure-sensitive adhesive layer to maintain the adhesiveness, peel property, or transparency or the like.

The adhesive agent mainly included in the composition of the pressure-sensitive adhesive layer 104 is not limited to the particular one so long as the adhesive agent is not adherent in a normal status and is adherent when being pressurized. For example, the adhesive agent may be any adhesive agent that can be selected from among substances used for substances generally used for the composition of the pressure-sensitive adhesive layer (e.g., natural rubber, synthetic rubber). In particular, natural rubber latex obtained by the graft copolymerization of natural rubber with styrene methyl methacrylate is preferred in view of the blocking resistance, heat resistance, abrasion resistance or the like.

The pressure-sensitive adhesive layer 104 also can be appropriately blended with other additive agents (e.g., dispersant, thickener, flow modifier, antifoam agent, foam control agent, release agent, foaming agent, penetrating agent, fluorescent brightening agent, ultraviolet absorber, antioxidizing agent, antiseptic agent, antifungal agent, water resistant additive, wet strength agent, dry paper force enhancing agent, antistatic agent, age inhibitor).

The composition of the pressure-sensitive adhesive layer 104 (pressure-sensitive adhesive agent) can be coated on the base member 103 by the same method as a conventional method to coat the pressure-sensitive adhesive agent on the pressure-sensitive adhesive sheet. The dry coating amount of the pressure-sensitive adhesive layer is generally in a range from 3 to 30 g/m$^2$, preferably 3 to 20 g/m$^2$, and more preferably 3 to 15 g/m$^2$. The dry coating amount of the pressure-sensitive adhesive layer lower than 3 g/m$^2$ tends to cause an insufficient adhesion force. The dry coating amount of the pressure-sensitive adhesive layer exceeding 30 g/m$^2$ may cause a risk where an excessively-strong adhesion force breaks the base member during the peeling to break the printed information.

Figure 2A:
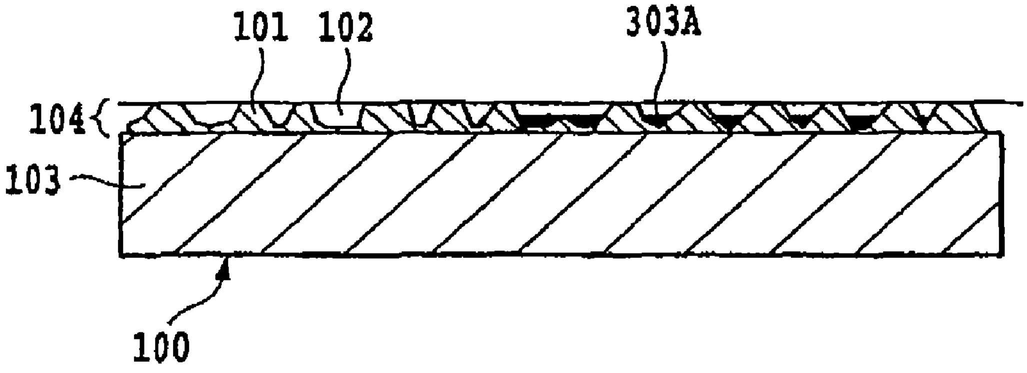
FIG. 2A is a cross-sectional view illustrating a printed document in which an image is printed on the pressure-sensitive adhesive sheet of FIG. 1A.
Figure 2B:
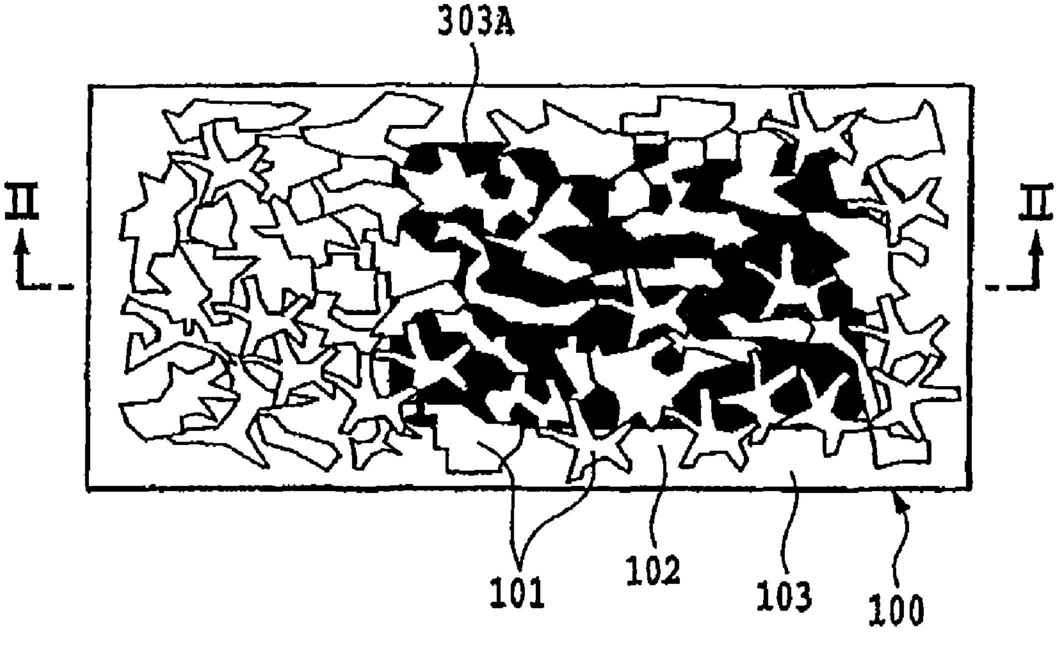
FIG. 2B is a top view illustrating the printed document.

FIG. 2A is a cross-sectional view illustrating the active energy ray-curable aqueous ink that is applied to the pressure-sensitive adhesive sheet 100 and is cured. FIG. 2B is a top view illustrating the pressure-sensitive adhesive sheet 100. FIG. 2A is a cross-sectional view taken along the line II-II of FIG. 2B.

In the case of this example, the active energy ray-curable aqueous ink is ejected as described later through the inkjet printing head onto the pressure-sensitive adhesive layer 104. Thereafter, the active energy line-curable aqueous ink permeates the concave sections 102 among the plurality of the convex sections 101. As a result, the convex section 101 is exposed without being covered by color material 303A of aqueous ink.

(The Active Energy Ray-Curable Aqueous Ink)

Ink used in this example (printing fluid) is composed of color material, photopolymerization initiator, active energy ray-curable monomer, oligomer, polymer, and the mixture thereof. Alternatively, ink in this example also may be added with ion-exchange water, organic solvent, surface acting agent or the like in order to obtain an inkjet adequacy. In particular, when nonabsorbable printing medium not absorbing ink (e.g., plastic, metal) is subjected to a printing operation, ultraviolet ray-curable monomer or oligomer can be used as solvent to provide a printed document that causes no burden on an environment and that has a superior adhesiveness. The active energy ray-curable monomer, oligomer, and polymer are preferably a compound having an ethylene unsaturated bond that can be subjected to a radical polymerization and may be any compound so long as the compound has in molecules one or more ethylene unsaturated bonds that can be subjected to a radical polymerization. However, the compound must be selected in consideration of the compatibility to pigment dispersant or solvent. Alternatively, two or more compounds also can be combined with a predetermined ratio in order to obtain the inkjet adequacy and the robustness of a printed document.

A compound having an ethylene unsaturated bond that can radically polymerized may be, for example, unsaturated carboxylic acid (e.g., acrylic acid, methacrylic acid, itaconic acid, crotonic acid, isocrotonic acid, maleic acid) and the salt thereof, ester, urethane, amide, anhydride, acrylonitrile, and styrene. Various radical polymerizable compounds such as unsaturated polyester, unsaturated polyether, unsaturated polyamide, or unsaturated urethane can be used. Specifically, monofunctional acrylate may be: methyl acrylate, ethyl acrylate, butyl acrylate, dodecyl acrylate, 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, diethylaminoethyl acrylate, dimethylaminoethyl acrylate, phenoxyethyl acrylate, glycidylethyl acrylate, methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate or the like.

Alternatively, those having two or more functional groups may be: 1,4 butylene glycol diacrylate, 1,3 butylene glycol diacrylate, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate or the like. In addition to them, oligoester acrylate, N-methylol acrylamide, diacetone acrylamide, epoxy acrylate or the like also may be used. These substances are included in the printing fluid in a range from 5 weight % to 90 weight %.

Photopolymerization initiator can be the known one used to cure ultraviolet cure monomer, oligomer, and polymer. Photopolymerization initiator is preferably the molecule cleaved one or the hydrogen abstraction-one. Specifically, photoinitiator may be: benzoin isobutyl ether, 2,4-diethyl thioxanthone, 2-isopropyl thioxanthone, benzyl, 2,4,6-trimethylbenzoyl diphenyl phosphine oxide, 2-benzyl-2-dimethyl amino-1-(4-morpholinophenyl)-butane-1-on, bis(2,6-dimethoxybenzoyl)-2,4,4-trimethylpentyl phosphine oxide, 1-hydroxycyclohexyl phenyl ketone, benzoin ethyl ether, benzyl dimethyl ketal, 2-hydroxy-2-methyl-1-phenylpropane-1-on, 1-(4-isopropylphenyl)-2-hydroxy-2-methylpropane-1-on and 2-methyl-1-(4-methylthiophenyl)-2-morpholinopropane-1-on, benzophenone, 4-phenylbenzophenone, isophthalphenon, 4-benzoyl-4'-methyl-diphenyl sulfide, or photoinitiator obtained by introducing into these substances ethylene oxide chain, and propylene oxide chain to improve the water-solubility.

Color material used for ink (printing fluid) can be any of dye and pigment. From the viewpoints of the stability to the irradiation of active energy line and the reliability of a printed document, pigment is more preferred. When dye is used, metal-containing dye having a strong light resistance is preferred. Ink (printing fluid) used in the present invention preferably includes color material having a weight ratio in a range from 1 to 20% (preferably in a range from 2 to 12%).

Carbon black used for black ink may be the one by the Furness method, the one by the channel method, or the one obtained by subjecting high-specific surface area carbon (carbon black material) manufactured by activating petroleum coke by a great amount of alkali to a fluorine processing from a gas phase, a plasma processing of hydrophilic polymerizable monomer, a graft polymerization of hydrophilic monomer from liquid phase or the like. The carbon black as described above has the first particle diameter form 15 to 40 μm, a specific surface area by the BET method from 50 to 3000 square m/g, a DBP oil absorption amount from 40 to 150 ml/100 g, a volatile matter content from 0.5 to 10%, and a pH value from 2 to 9.

A yellow pigment may be pigment yellow 1, 2, 3, 12, pigment yellow 13, pigment yellow 14, pigment yellow 16, pigment yellow 17, pigment yellow 55, pigment yellow 73, pigment yellow 74, pigment yellow 75, pigment yellow 83, pigment yellow 93, pigment yellow 95, pigment yellow 97, pigment yellow 98, pigment yellow 109, pigment yellow 110, pigment yellow 114, pigment yellow 128, pigment yellow 138, pigment yellow 139, pigment yellow 150, pigment yellow 151, pigment yellow 154, pigment yellow 180 or the like.

Magenta pigment may be pigment red 5, pigment red 7, pigment 12, pigment 48 (Ca), pigment red 48 (Mn), pigment red 57:1, pigment red 57 (Sr), pigment red 57:2, pigment red 122, pigment red 123, pigment red 168, pigment 184, pigment red 202, pigment red 238 or the like.

Cyan pigment may be pigment blue 1, pigment blue 2, pigment blue 3, pigment blue 16, pigment blue 22, pigment blue 60, pigment blue 15:2, pigment 15:3, bat blue 1, bat blue 60 or the like. The pigment as described above is dispersed by polymer resin and is used for printing fluid. Polymer resin is selected that has a superior compatibility with used solvent, monomer, oligomer, and polymer.

In order to improve the inkjet adequacy, the preservation stability of the printing fluid, and the moisture retention at a nozzle tip end of the inkjet printing head, the printing fluid can include a component such as ion-exchange water, glycol-base solvent, pyrrolidone-base solvent, lower alcohol-base solvent, glycol ether-base solvent, glycerin, glycerin derivative, urea, ethylene urea, urea derivative or the like.

When ink (printing fluid) is not water-based, aromatic hydrocarbons, aliphatic hydrocarbons, the alcohols, esters, the ketones, silicone oil, mineral oil (paraffinum liquidum), wax, higher fatty acid, higher alcohol or the like may be used alone or in combination. Pigment dispersing resin may be acrylic resin (e.g., acrylic acid ester resin, methacrylic acid ester resin, polyacrylic acid ester resin, ethylene-ethyl acrylate copolymer), olefin resin, phenolic resin, xylene resin, polyamide resin, polyester resin, ketone resin, alkyd resin, rosin resin, petroleum resin, ethylene-vinyl acetate copolymer resin, vinyl acetate resin, vinyl chloride-vinyl acetate copolymer resin, ethylene-vinyl chloride-vinyl acetate copolymer resin, ethyleneimine-hydroxy stearic acid copolymer or the like.

In addition to the respective materials described above, the ink used in the present invention (printing fluid) can be added with surfactant, antiseptic agent, antioxidizing agent, and other subsidiary materials for adjusting the property. The surfactant may be nonionic surfactant, amphoteric surfactant, cationic surfactant or the like. These surfactant are added for the purpose of achieving the permeability of printing fluid to a printing medium such as a paper, the wettability to a constituting member of the inkjet printing head, the flow property, or auxiliary substance to the dispersion stability or the like.

Furthermore, the ink (printing fluid) used in the present invention is preferably used after cleaning and purifying color material in order to remove impurities. For example, a constituting component adapted to a used inkjet method may be mixed in the printing fluid to subsequently subject the mixture to filtering and centrifugal separation or the like to remove impurities to obtain the printing fluid used in the present invention.

Water is preferably added to aqueous ink with an additive amount in a range from 50 weight % to 80 weight % and more preferably in a range from 60 weight % to 70 weight %. The addition in a range lower than 50 weight % causes a higher viscosity to cause not only a deteriorated ink ejecting performance but also an ink surface tension to tend to cause a defective fixing and the ink offset. The addition in a range exceeding 80 weight % may cause a problem of a slower curing speed for example.

(Ink Viscosity)

When the on-demand-type inkjet apparatus is used, the ink viscosity preferably does not have nonlinearity in a wide range and is lower than 15 mPa·s. More preferably, the ink viscosity is lower than 5 to 10 mPa·s. The ink viscosity exceeding 15 mPa·s tends to cause ink to be adhered to the nozzle to cause the clogged nozzle. The ink viscosity was measured by using the BL-type viscometer (made by Toki Sangyo Co., Ltd.) to rotate a test cone (outer diameter R=24 mm) with a rotating speed appropriately adjusted in a range of 60 rpm to measure the viscosity at 25 degrees.

(Ink Surface Tension)

The ink surface tension is preferably from 20 mN/m to 50 mN/m. The surface tension lower than 20 mN/m may cause ink to permeate the pressure-sensitive adhesive layer to cause a deteriorated reflection image density to fail to prevent the formation of a high-definition image required for a bar code printing. The surface tension exceeding 50 mN/m can allow ink droplets to be effectively cured at the surface of a printing medium to sufficiently suppress the bleed and to obtain a high image density. On the other hand, in order to secure this image density, an active energy irradiation (which will be described later) requires a printing medium to be wetted by ink droplets to a certain level. Thus, the upper limit of the surface tension is more preferably about 50 m N/m. The surface tension here means a static surface tension that is measured by using an automatic surface tensiometer CBVP-Z (made by Kyowa Interface Science Co., Ltd.) to use a platinum plate to measure the surface tension at 25 degrees C.

(Permeability of Pressure-Sensitive Adhesive Sheet)

The pressure-sensitive adhesive sheet of the present invention was caused to absorb water to use a dynamic permeability tester for measuring the fluid absorption by ultrasound to measure the time during which the maximum ultrasonic permeates the sheet. It was found that the time during which the maximum ultrasonic permeates the sheet is preferably 1 second or more to cause the maximum ultrasonic permeation rate 80% or more.

When a paper medium was caused to absorb water to measure the absorption by an ultrasonic-type dynamic permeability tester and when the time during which the maximum ultrasonic permeates the sheet is 1 second or more to cause the maximum ultrasonic permeation rate lower than 80%, the spread of ink dots formed by an inkjet printing method (which will be described later) is increased. In such a case, the printed image has a lower reflection density to cause a risk to deteriorate fine printing small characters and the accuracy at which bar codes are read. In this example, the active energy ray-curable aqueous ink is ejected to the pressure-sensitive adhesive sheet as described later.

(Printing Method)

FIG. 3A to FIG. 3D and FIG. 4A to FIG. 4D illustrate steps of using the inkjet printing head to eject the ultraviolet ray-curable cure aqueous ink as the active energy ray-curable aqueous ink (hereinafter also referred to as "UV ink") 303 onto the pressure-sensitive adhesive sheet 100 to fix the ink. Each of FIG. 3A to FIG. 3D is a cross-sectional view taken along the line III-III of FIG. 4A to FIG. 4D, respectively.

In the inkjet printing apparatus, the pressure-sensitive adhesive sheet 100 is transported in the direction shown by the arrow X. When a printing region on the pressure-sensitive adhesive sheet 100 is opposed to the inkjet printing head 302, ink is ejected from the printing head 302. The UV ink 303 is ejected through a plurality of the nozzles of the printing head 302 to apply the UV ink 303 to the pressure-sensitive adhesive sheet 100.

Figure 3A:
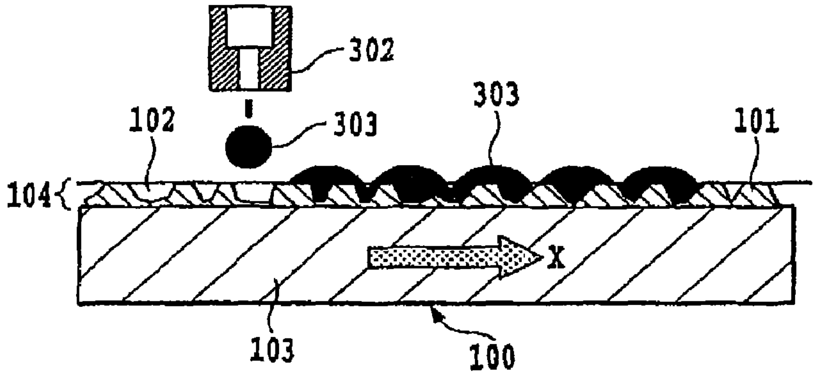
FIG. 3A to FIG. 3D are cross-sectional views illustrating steps of printing an image on the pressure-sensitive adhesive sheet of FIG. 1A, respectively.
Figure 3B:
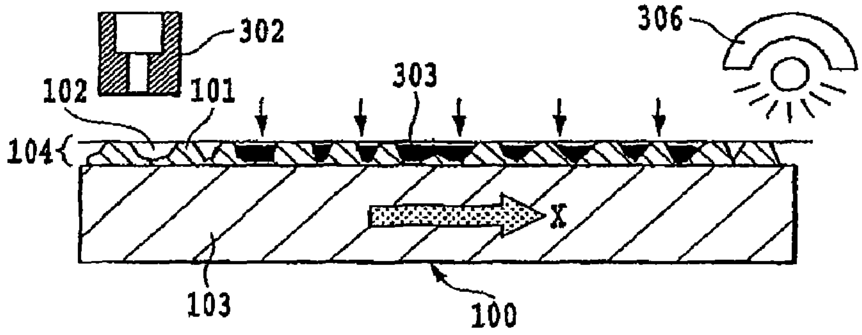
Figure 4A:
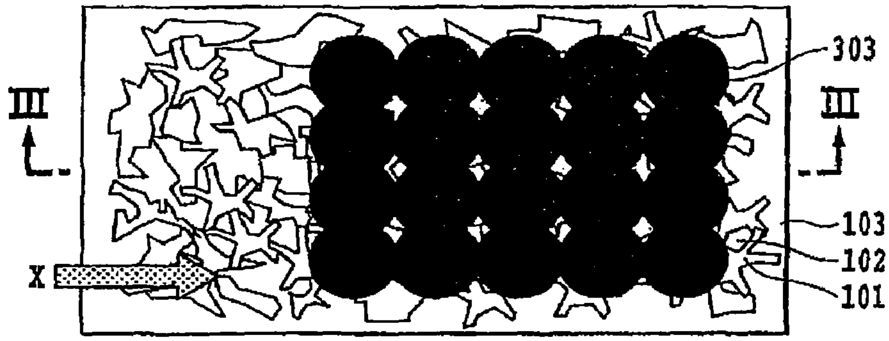
FIG. 4A to FIG. 4D are top views illustrating steps of printing the image on the pressure-sensitive adhesive sheet of FIG. 1A, respectively.
Figure 4B:
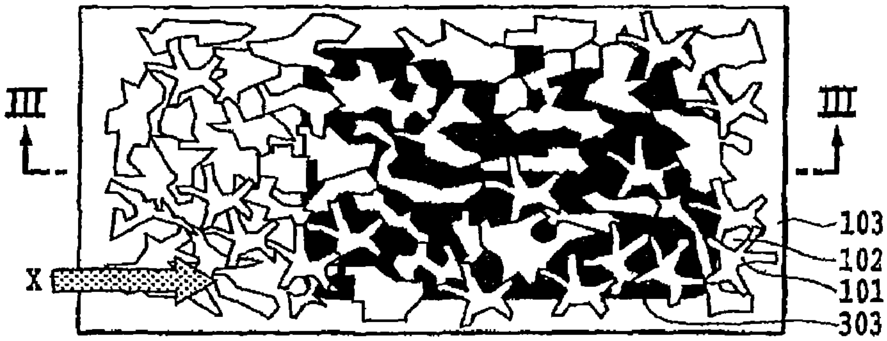

The ink 303 applied to the pressure-sensitive adhesive sheet 100 lands on the island-like convex section 101 and the groove-like concave section 102 in the pressure-sensitive adhesive layer 104 as shown in FIG. 3A and FIG. 4A. However, the ink 303 lands on the convex section 101 gradually permeates the concave section 102 through the capillary phenomenon and a part or the entirety thereof is stored in the concave section 102 as shown in FIG. 3B and FIG. 4B. In accordance with this, the top of the convex section 101 is gradually exposed. FIG. 3B and FIG. 4B show the status where the permeation phenomenon of the ink 303 as described above is completed or the permeation still continues and the top of the convex section 101 is substantially exposed.

Figure 3C:
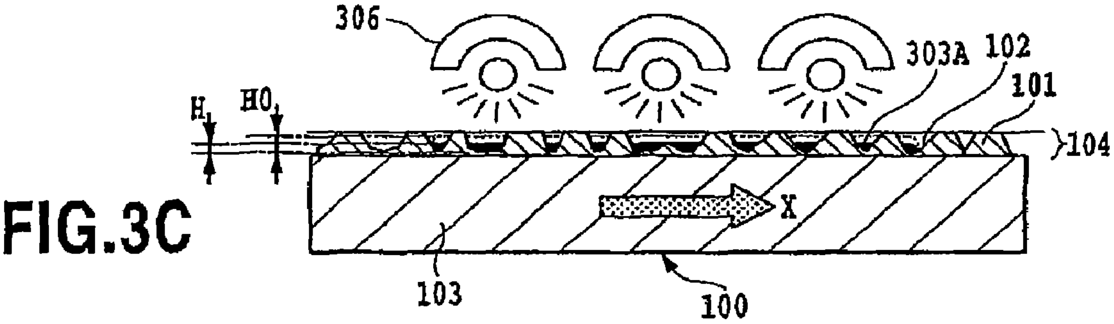
Figure 3D:
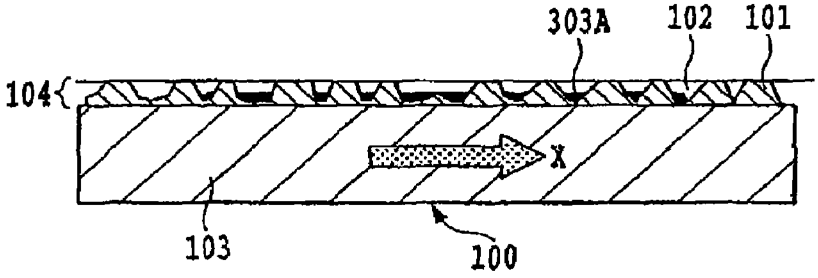
Figure 4C:
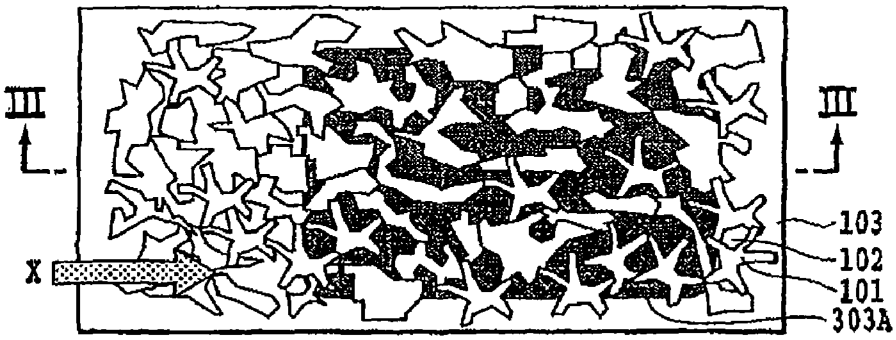
Figure 4D:
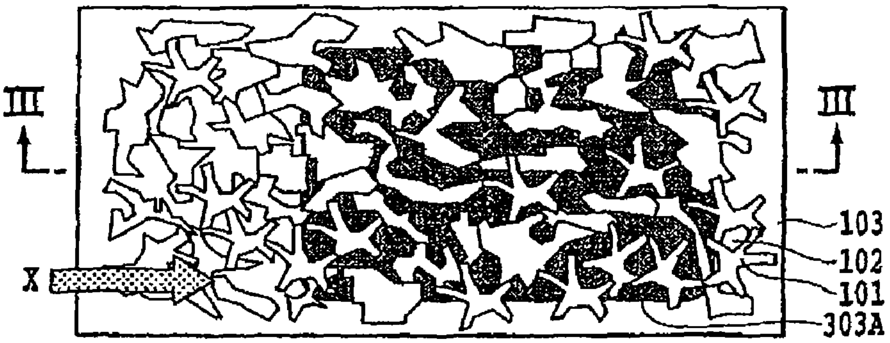

Thereafter, the pressure-sensitive adhesive sheet 100 is transported in the direction shown by the arrow X and the printing region applied with the ink 303 is opposed to an ultraviolet irradiation lamp 306. Then, ultraviolet ray is emitted from the lamp 306 to the printing region. The ultraviolet ray causes ultraviolet ray curing agent (UV curing agent) included in the ink 303 to start a curing reaction. Specifically, the ink 303 contained in the concave section 102 starts the curing while extruding water therein as shown in FIG. 3C and FIG. 4C. Furthermore, ultraviolet ray or a heat source (not shown) causes moisture to be evaporated to cause the color material 303A to be fixed into the concave section 102. In this example, the ultraviolet ray cure aqueous ink is used as the ink 303 to allow the ink 303 to permeate the concave section 102 to subject ink to ultraviolet light while the convex section 101 is being exposed. When the pressure-sensitive adhesive layer 104 includes ultraviolet ray curing agent (UV curing agent), the irradiation of ultraviolet ray causes the convex section 101 to start the curing reaction to subsequently shift to a status where a pressure-contacting step (which will be described later) is waited.

The ink 303 may be applied to the pressure-sensitive adhesive sheet 100 in an amount not limited to a particular amount so long as the ink 303 is stored in the concave section 102. Thus, the applied amount of the ink 303 can be appropriately adjusted in accordance with the pressure-sensitive adhesive sheet 100. When the applied amount of ink is excessive, a risk may be caused where ink covers the convex section of the pressure-sensitive adhesive layer to fail to provide the predetermined adhesion force (which will be described later).

(Ultraviolet Irradiation Lamp)

The ultraviolet irradiation lamp 306 is preferably a so-called low-pressure mercury lamp, a high-pressure mercury lamp, or a mercury lamp coated with fluorescent substance or the like that has a vapor pressure of mercury during lighting in a range from 1 to 10 Pa. These mercury lamps have an emission spectrum in an ultraviolet ray region of 450 nm or less (in particular, an emission spectrum in an ultraviolet ray region in a range from 184 nm to 450 nm in order to provide an effective reaction of polymerizable substances in a black color or a colored ink). The lamp 306 as described above can use a small power source and thus is suitable when the power source is provided in the printing apparatus. The mercury lamp may be, for example, a metal halide lamp, a high-pressure mercury lamp, an ultrahigh-pressure mercury lamp, a xenon flash tube, a deep UV lamp, a lamp using a microwave to excite a mercury lamp from outside in an electrodeless manner, or a UV laser or the like. Since these emission wavelength regions include the above range, various lamps as described above can be basically used so long as the power source size, an input intensity, the lamp shape or the like is permissible. The light source is also selected depending on the sensitivity of catalyst to be used.

A required ultraviolet intensity is preferably in a range from about 1 $mW/cm^2$ to 5,000 $mW/cm^2$ in view of the relation with the ink polymerization speed. An insufficient irradiation intensity fails to provide sufficient curing of ink, causing a risk where the ink offset phenomenon may be caused. An excessive irradiation intensity may cause a damage in the base member of the pressure-sensitive adhesive sheet, the color degradation of color material of ink, or a deteriorated adhesion force of the pressure-sensitive adhesive layer. Alternatively, a plurality of ultraviolet lamps having UV wavelengths suitable for the adhesive agent and ink forming the pressure-sensitive adhesive layer also may be provided, respectively.

(Preheating)

When ink (printing fluid) includes water-soluble organic solvent, ink may be heated by a dryer, a microwave oscillation apparatus, or a far-infrared lamp or the like before ultraviolet irradiation to remove solvent left in the ink. As a result, the ink offset phenomenon can be reduced. A timing at which ink is heated is not limited to a particular timing so long as the timing is before the ultraviolet irradiation. The pressure-sensitive adhesive sheet also may be heated prior to the inkjet printing.

(Height of Ink on Pressure-Sensitive Adhesive Sheet)

The aqueous ink of this example includes at least moisture of 50% or more. Thus, as shown in FIG. 3C, the thickness H when ink is fixed on the pressure-sensitive adhesive sheet is 50% or lower of the thickness HO when ink is applied on the pressure-sensitive adhesive sheet. When the thickness H is higher than 50% of the thickness HO, ink may partially cover the convex section 101 to cause a deteriorated adhesion force of the pressure-sensitive adhesive layer or to cause the ink offset. Ink applied to the pressure-sensitive adhesive layer preferably has a thickness reduced in a range from 10% to 70% when being cured.

(Adhesion and Peeling of Pressure-Sensitive Adhesive Sheet)

As described above, the ink 303 is applied on the pressure-sensitive adhesive sheet 100 to subsequently emit ultraviolet to the ink, thereby preparing a printed document. Next, the following section will describe the adhesion and peeling between the pressure-sensitive adhesive sheets 100 as the printed document as described above.

Figure 5A:
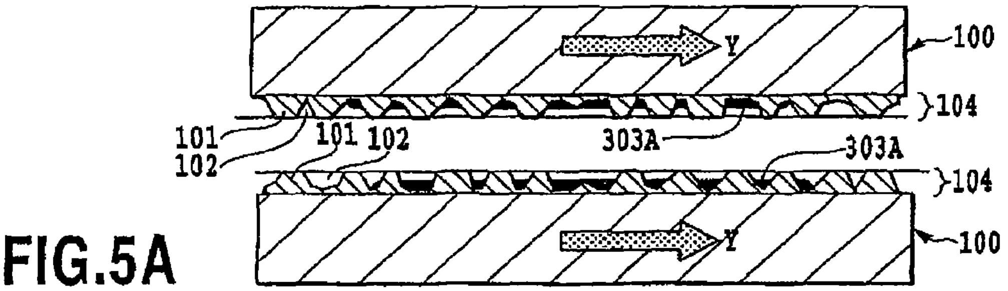
FIG. 5A to FIG. 5D are cross-sectional views illustrating a step of adhering the pressure-sensitive adhesive sheets of FIG. 1A to each other and a peeling step.
Figure 5B:
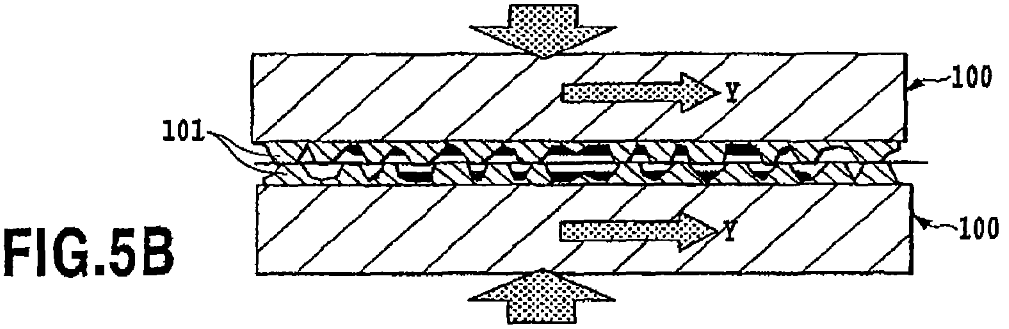
Figure 5C:
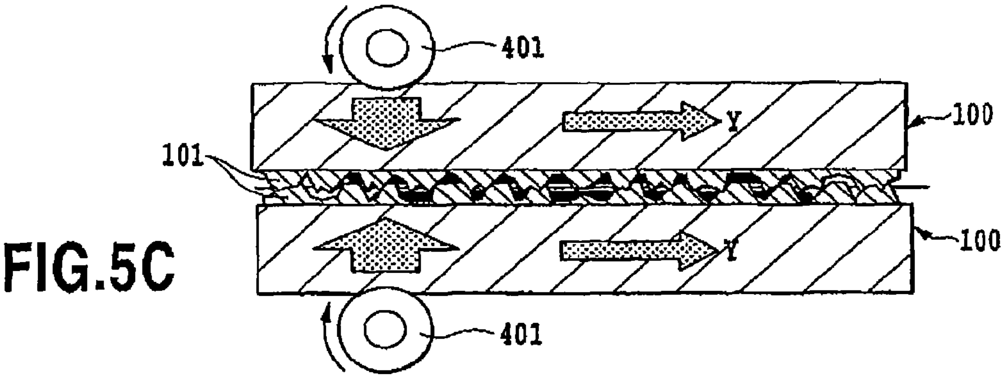

As shown in FIG. 5A and FIG. 5B, the two pressure-sensitive adhesive sheets 100 as a printed document are opposed to each other or the one pressure-sensitive adhesive sheet 100 is bent to oppose and abut the pressure-sensitive adhesive layers 104. The method to oppose and abut the pressure-sensitive adhesive layers 104 is not limited to a particular method. For example, the pressure-sensitive adhesive sheet 100 also may be folded to provide two or three parts. Then, as shown in FIG. 5B, the pressure-sensitive adhesive layers 104 are caused to abut to each other. Then, a predetermined pressure is applied as shown in FIG. 5C to adhere the pressure-sensitive adhesive layers 104 to each other. In this example, a pressurization roller 401 is used to apply a pressure to the pressure-sensitive adhesive sheets 100 while transporting the pressure-sensitive adhesive sheets 100 in the direction shown by the arrow Y in FIG. 5C. The pressurization roller 401 preferably provides a pressurization force in a range from about 1 kg/cm$^2$ to 10 kg/cm$^2$.

In the pressure-sensitive adhesive layers 104, the color material 303A of the ink is fixed in the concave section 102 and the convex section 101 is exposed without being covered by the color material 303A. Thus, the pressure-sensitive adhesive layers 104 are adhered to each other by allowing the respective convex sections 101 to be abutted to each other. Since the color material 303A is fixed in the concave section 102, the color material 303A is not positioned on the adhesion surfaces of the pressure-sensitive adhesive layers 104. Specifically, in one of the pressure-sensitive adhesive layers 104, the color material 303A in the concave section 102 is surrounded by the convex section 101 and is prevented from having a contact with the other pressure-sensitive adhesive layer 104. This can prevent the occurrence of the ink offset as will be described later.

Alternatively, when the pressure-sensitive adhesive layer 104 includes ultraviolet curing agent (UV-curing agent), ultraviolet light also may be emitted to increase the adhesion force of the convex sections 101 to be adhered to one another or the convex sections 101 also may be partially welded to adhere the pressure-sensitive adhesive layers 104 in a more secure manner.

Figure 5D:
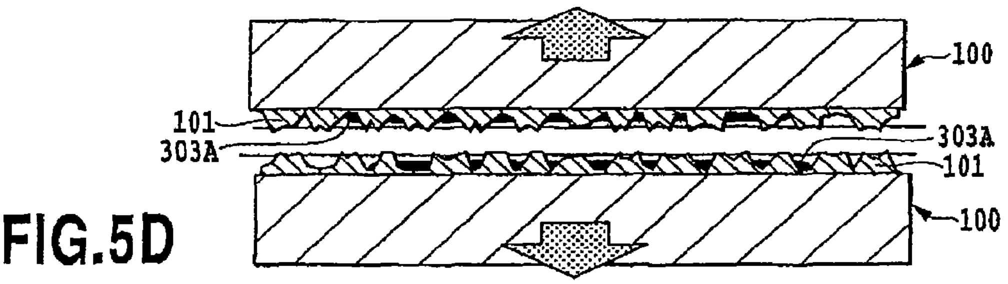

By adhering the pressure-sensitive adhesive sheets to each other as described above, the so-called information-supporting sheet is formed. FIG. 5D is a schematic cross-sectional view when the interface of the information-supporting sheet as described above is peeled. As described above, since the color material 303A of the ink 303 is stored and cured in the concave section 102, a phenomenon can be suppressed from occurring in which the color material 303A at one of the pressure-sensitive adhesive layers is transferred to the convex section 101 at the other pressure-sensitive adhesive layer (i.e., ink offset phenomenon). Furthermore, the convex sections 101 of the respective pressure-sensitive adhesive layers adhered without being covered by the color material 303 can suppress the ink offset phenomenon from occurring without causing a deteriorated adhesion force.

(Another Example of Printed Document)

The following section will describe another example of the printed document obtained by applying the ink 303 on the pressure-sensitive adhesive sheet 100 to subsequently emit ultraviolet light thereto.

Figure 6:
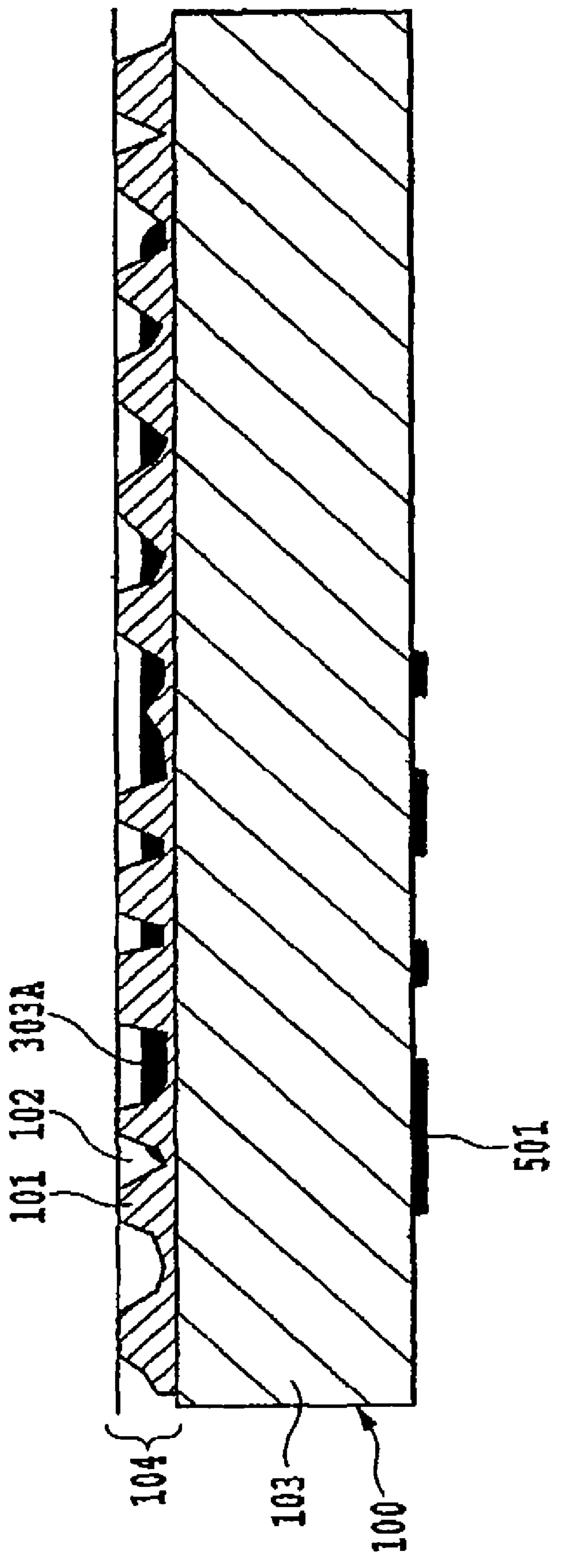
FIG. 6 is a cross-sectional view illustrating another configuration example of a printed document in which an image is printed on a pressure-sensitive adhesive sheet.

In the printed document shown in FIG. 6, the ink 501 that is the same as or different from the above-described ink 303 is used to print various information and images on parts other than the pressure-sensitive adhesive layer 104 of the pressure-sensitive adhesive sheet 100. The printed document of this example can be used for a postcard or the like. As described above, the pressure-sensitive adhesive layer 104 can be opposed and abutted to another pressure-sensitive adhesive layer to support individual information or the like and to use the ink 304 to print information for an address or the like. By using the above-described ink 303 as the ink 501, an image having high-definition and high robustness can be printed. Alternatively, when one surface of the pressure-sensitive adhesive sheet 100 includes a region in which the pressure-sensitive adhesive layer 104 is formed and a region in which the pressure-sensitive adhesive layer 104 is not formed, the latter region also may be subjected to a printing operation by the ink 501.

Figure 7:
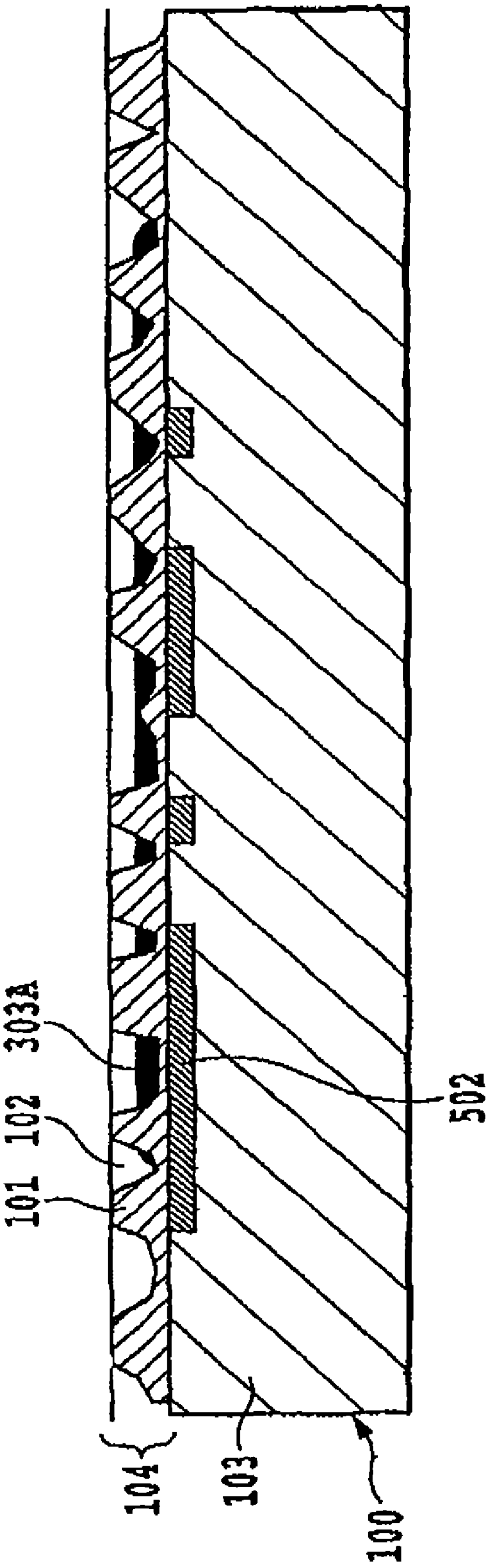
FIG. 7 is a cross-sectional view illustrating still another configuration example of a printed document in which an image is printed on the pressure-sensitive adhesive sheet.

The printed document shown in FIG. 7 is structured so that various information and images is printed (pre-printed) by the ink 502 on the base member 103 on which the pressure-sensitive adhesive layer 104 is not yet formed. The pre-printing may use a method such as the offset printing or a gravure printing or the like. Alternatively, the inkjet printing method also may be used to preferably use the above-described ink 303 as the ink 502. The printed contents by the ink 502 can be visually recognized through the transparent or translucent pressure-sensitive adhesive layer 104. Alternatively, the information and image printed by the ink 502 and the information and image printed by the ink 303 also can be partially superposed or dislocated from each other.

Figure 8:
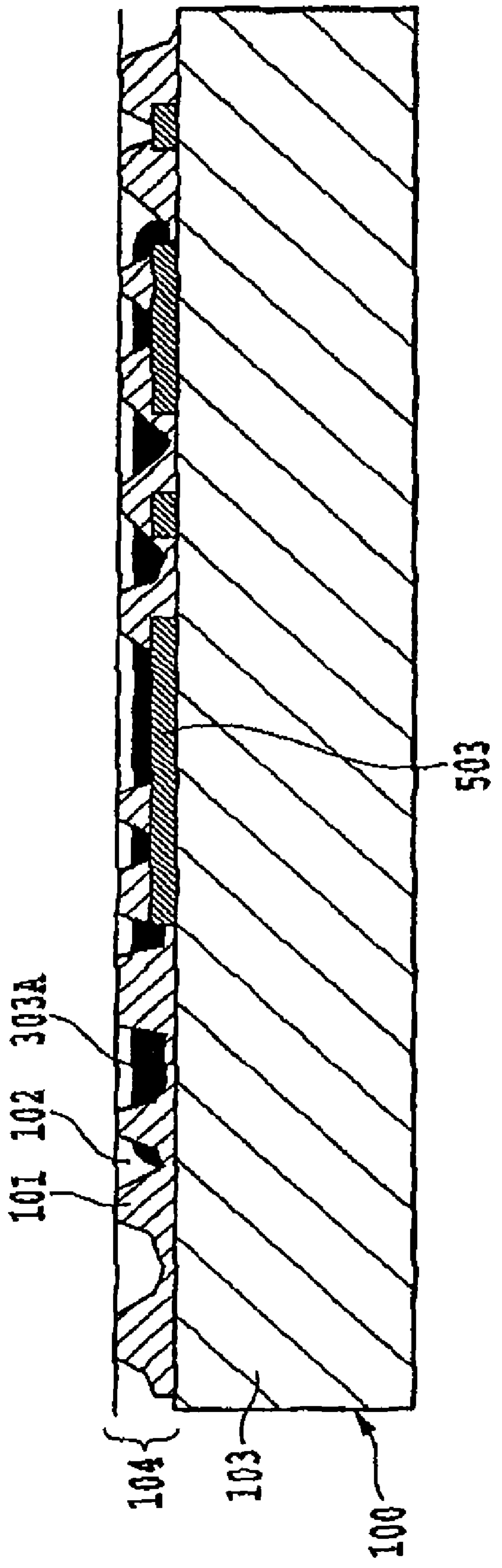
FIG. 8 is a cross-sectional view illustrating still another configuration example of a printed document in which an image is printed on the pressure-sensitive adhesive sheet.

The printed document shown in FIG. 8 is structured so that the ink 503 is used to form a covering layer over the base member 103 on which the pressure-sensitive adhesive layer 104 is not yet formed. This covering layer can be formed by the offset printing or the gravure printing or the like. This covering layer also can be formed by the inkjet printing method by the above-described ink 303 as the ink 503. The ink 503 forming this covering layer can be visually recognized through the transparent or translucent pressure-sensitive adhesive layer 104. Alternatively, the information and image printed by the ink 503 and the information and image printed by the ink 303 also can be partially superposed or dislocated from each other.

Figure 9:
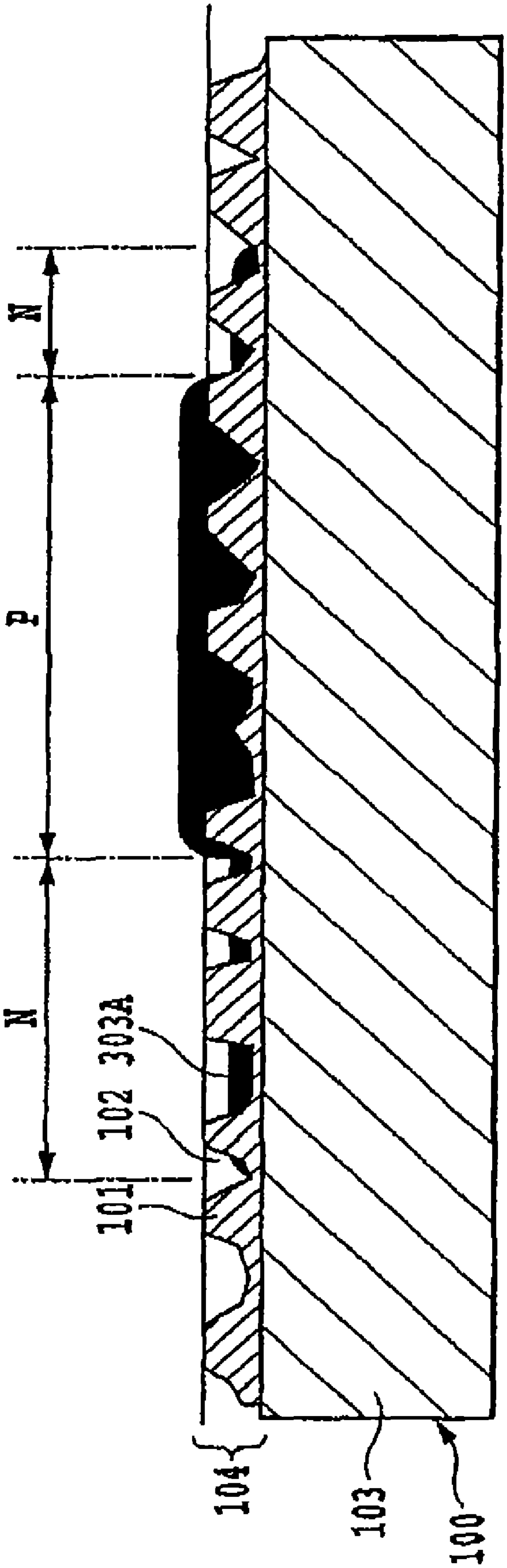
FIG. 9 is a cross-sectional view illustrating still another configuration example of a printed document in which an image is printed on the pressure-sensitive adhesive sheet.

The printed document shown in FIG. 9 is structured so that a great amount of the ink 303 is partially applied to the pressure-sensitive adhesive layer 104. In a region P in which a great amount of the ink 303 is applied, the ink 303 cures while covering the convex section 101 of the pressure-sensitive adhesive layer 104 to cause a reduced adhesion force. In a region N in which an appropriate amount of the ink 303 is applied, the ink 303 cures without covering the convex section 101 of the pressure-sensitive adhesive layer 104 as described above, thus securing a sufficient adhesion force. In this manner, the adhesion force can be partially changed depending on the amount of applied ink 303. For example, in the information-supporting sheet in which the pressure-sensitive adhesive layers 104 are adhered to each other in a peelable manner, these weaken the adhesion force of apart at which the peeling is started, thereby causing them to be easily peeled. Alternatively, for the purpose of reducing the adhesion force of the pressure-sensitive adhesive layer 104, ink not including a color material component (clear ink) also can be used.

Figure 10A:
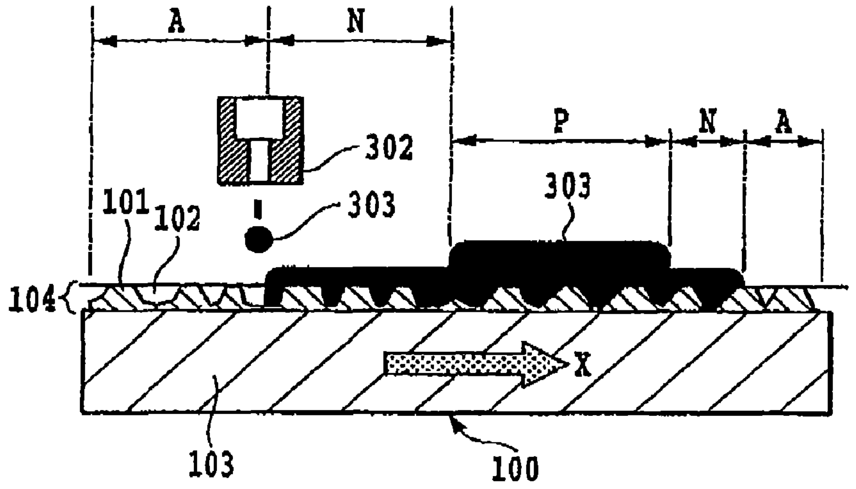
FIG. 10A and FIG. 10B are cross-sectional views illustrating steps of preparing the printed document of FIG. 9, respectively.
Figure 10B:
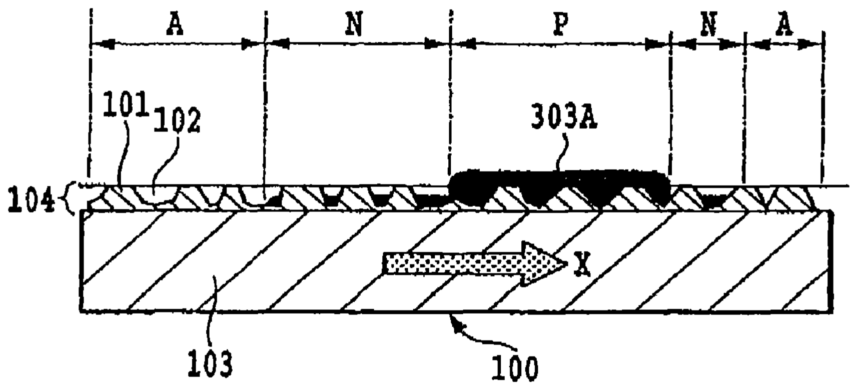

FIG. 10A, FIG. 10B, FIG. 11A, and FIG. 11B illustrate steps of manufacturing the printed document shown in FIG. 9. FIG. 10A and FIG. 10B are a cross-sectional view taken along the X-X line in FIG. 11A and FIG. 11B, respectively.

Figure 11A:
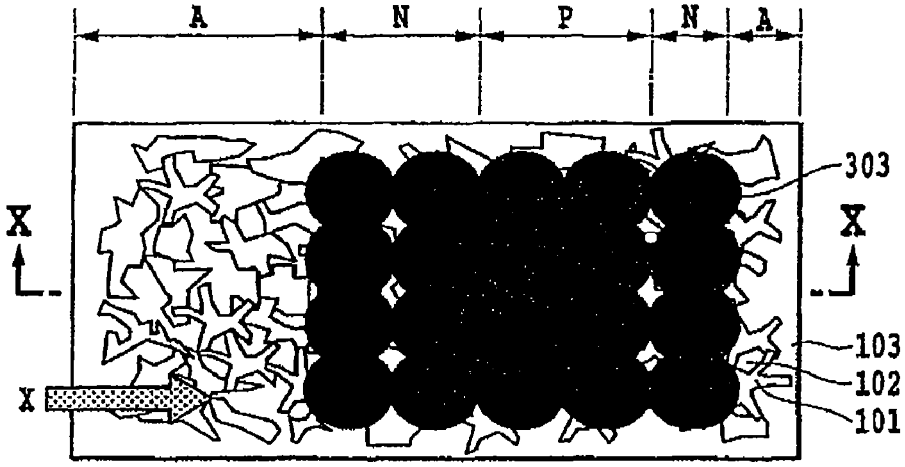
FIG. 11A and FIG. 11B are top views illustrating the steps of preparing the printed document of FIG. 9, respectively.
Figure 11B:
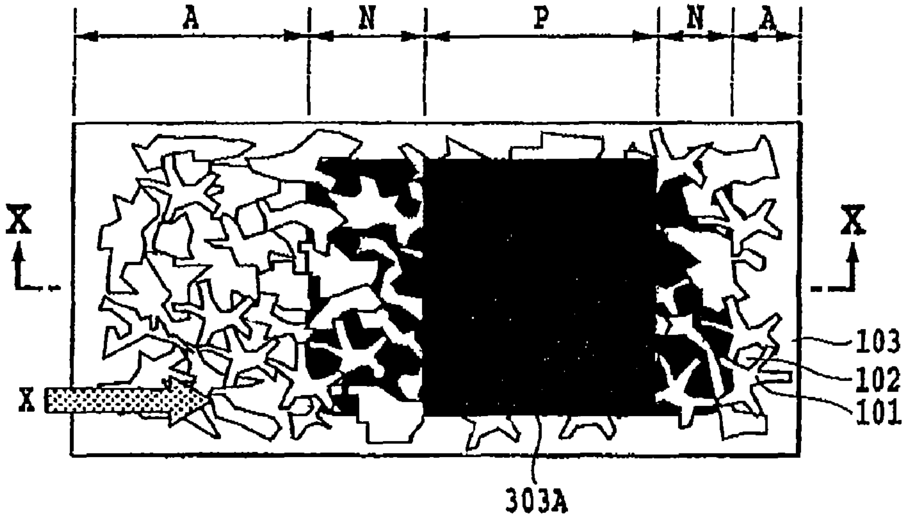

As shown in FIG. 10A and FIG. 11A, an appropriate amount of ink 303 enough to secure the sufficient adhesion force as in FIG. 3A as described above is applied to the region N on the pressure-sensitive adhesive layer 104. A great amount of the ink 303 is applied to the region P. The region A is a region to which the ink 303 is not applied. Thereafter, as in the case as described above, ultraviolet is emitted to cure the ink 303. As a result, as shown in FIG. 10B and FIG. 11B, the convex section 101 in the region N is exposed without being covered by the color material 303A of the ink 303 and the convex section 101 in the region P is covered by the color material 303A and is not exposed. As a result, the sufficient adhesion force is secured as in the region A with regard to the region N on the pressure-sensitive adhesive layer 104 and the adhesion force is weakened with regard to the region P.

(Configuration Example of Printing Apparatus)

Figure 12:
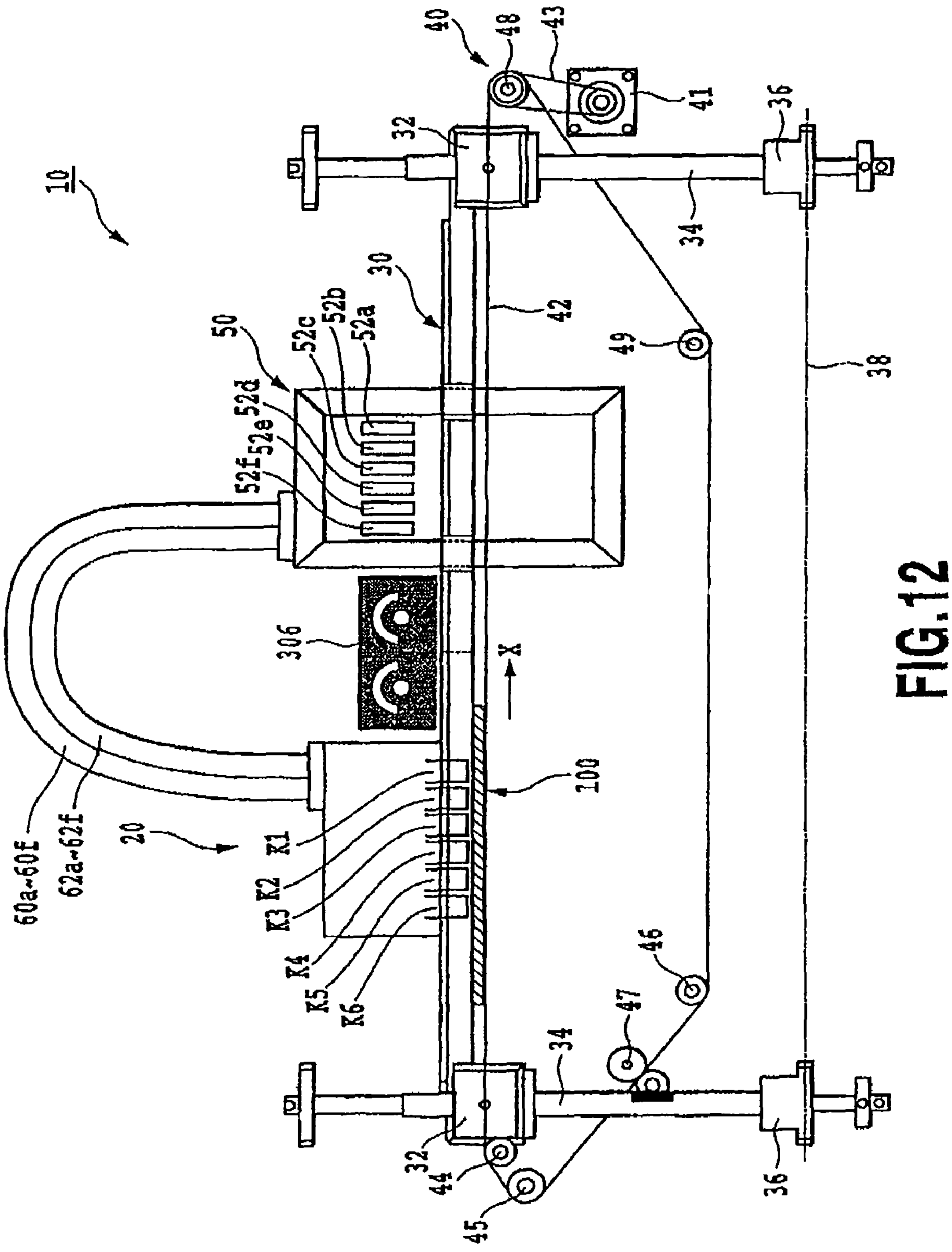
FIG. 12 is a schematic side view illustrating the configuration example of the printing apparatus of the present invention.

FIG. 12 is a schematic side view illustrating a configuration example of a printing apparatus to which the present invention can be applied. The printing apparatus of this example constitutes a line printer 10 in which a print module (print unit which will be described later) is installed.

In the line printer 10, a printing head unit 20 and a transport unit 40 are provided. On the printing head unit 20, inkjet printing heads K1, K2, K3, K4, K5, and K6 are mounted for ejecting ink onto the pressure-sensitive adhesive sheet 100 to print an image. The transport unit 40 transports the pressure-sensitive adhesive sheet 100 in the direction shown by the arrow X. Black ink is ejected from all of the printing heads K1, K2, K3, K4, K5, and K6. The printing head unit 20 includes a head up-down motor 118 (see FIG. 16) or the like to move the respective printing heads K1 to K6 to a capping position, a printing position, and a wiping position (which will be described later). The printing head unit 20 is fixed to a plate-like engine base 30. The printing head unit 20 and the engine base 30 are moved in the up-and-down direction as will be described later.

The engine base 30 fixed with the printing head unit 20 has a planar rectangle shape. The four corners are fixed with nuts 32. These nuts 32 are screwed to corresponding screw axes 34, respectively. The lower parts of these four screw axes 34 are fixed with sprockets 36. These four sprockets 36 have thereamong a hung chain 38. The chain 38 is rotated by a driving motor 41 to synchronously rotate the four screw axes 34 to move the printing head unit 20 in the up-and-down direction together with the nut 32 and the engine base 30.

The transport unit 40 includes four transport belts 42 in order to transport the pressure-sensitive adhesive sheet 100 to the lower position of the printing head unit 20. The transport belt 42 is hung among driven rollers 44, 45, and 46, an encoder roller 47, and a driving roller 48 and is given with the tension by a tensioner 49. The driving roller 48 is rotated by the driving motor 41 via a timing belt 43 to cause the transport belt 42 to have a circling movement in the transportation direction shown by the arrow X.

The line printer 10 includes an ink supply unit 50 to supply ink to the printing head unit 20. The ink supply unit 50 includes therein sub tanks 52*a* to 52*f* storing ink supplied to the respective printing heads K1 to K6. The ink supply unit 50 also includes therein ink tanks 53*a* to 53*f* (among which only the ink tank 53*a* is shown in FIG. 15) or the like to store ink supplied to the respective sub tanks 52*a* to 52*f*. The ink stored in the sub tank 52*a* is supplied to the printing head K1. The ink stored in the sub tank 52*b* is supplied to the printing head K2. Similarly, inks are supplied from the sub tanks 52*c* to 52*f* to the printing heads K3 to K6, respectively. Through a tube 56 (see FIG. 15), ink is supplied from the ink tank 53*a* to the sub tank 52*a*. Similarly, inks are supplied from the ink tanks 53*b* to 53*e* through the tubes to the sub tanks 52*b* to 52*e*, respectively.

The ink supply unit 50 and the printing head unit 20 have therebetween bundled ink supply tubes 60*a* to 60*f* and ink regression tubes 62*a* to 62*f* connected in a detachable manner. The ink supply tubes 60*a* to 60*f* form an ink supply path extending from the respective sub tanks 52*a* to 52*f* to the respective printing heads K1 to K6. The ink regression tubes 62*a* to 62*f* form an ink return flow path extending from the respective printing heads K1 to K6 to the respective sub tanks 52*a* to 52*f*. The printing head unit 20 includes a recovery unit 22 (see FIG. 15) in order to maintain the favorable status of ink ejected from the respective printing heads K1 to K6.

Reference numeral 306 denotes the above-described ultraviolet irradiation lamp (UV lamp). The ultraviolet irradiation lamp is provided at a position at which ultraviolet light can be emitted to the pressure-sensitive adhesive sheet 100 applied with ink.

Figure 13:
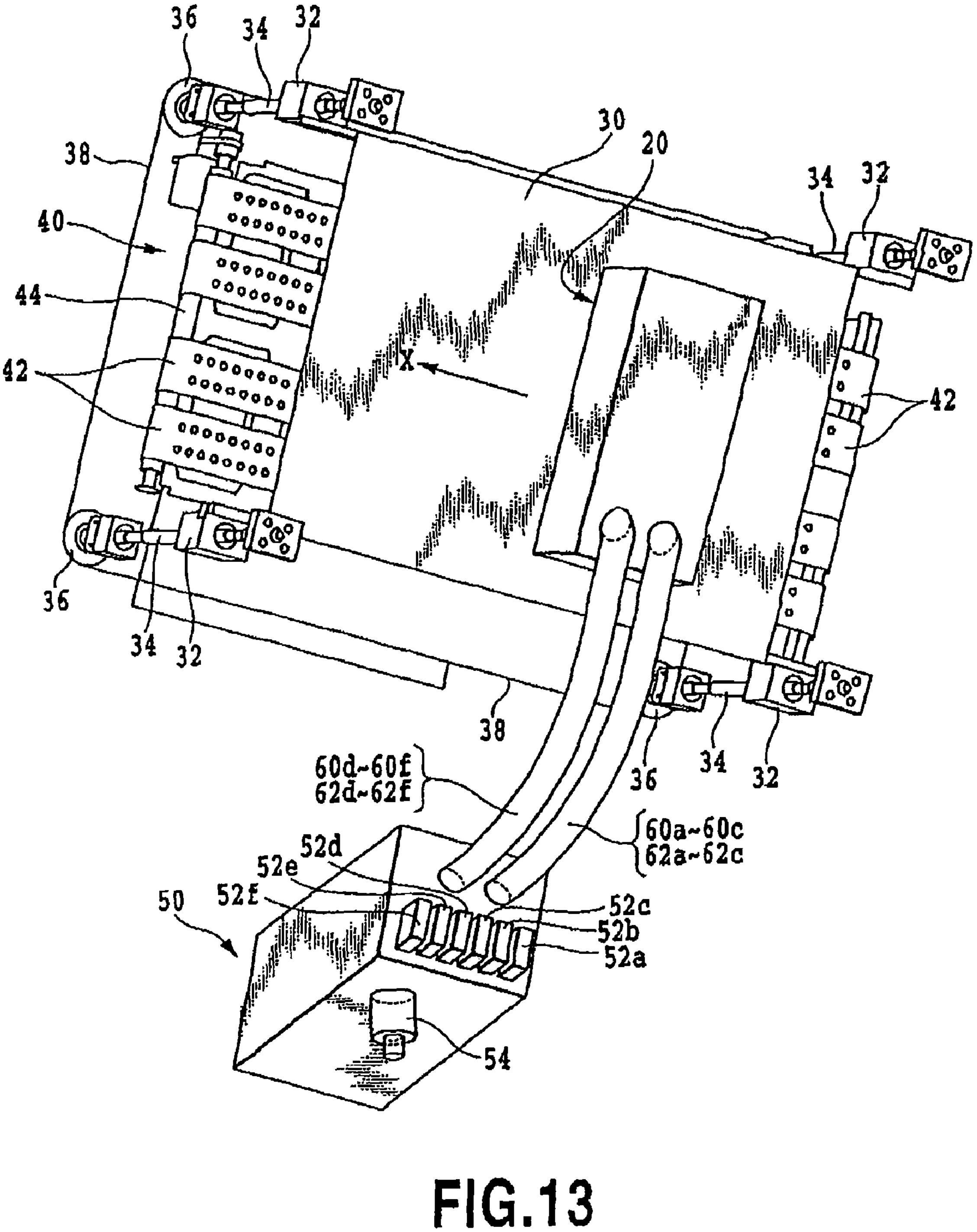
FIG. 13 is a perspective view illustrating the main part of the printing apparatus of FIG. 12.

FIG. 13 is a perspective view illustrating the main part of the printing head unit 20, the transport unit 40, and the ink supply unit 50.

The printing head unit 20 is integrated with the ink supply unit 50 by the ink supply tubes 60*a* to 60*f* and the ink regression tubes 62*a* to 62*f*. Hereinafter, the integrated structure as described above will be called as a print module. This print module includes therein a control system of FIG. 16. The respective printing heads K1 to K6 provided in the printing head unit 20 include a plurality of ejection openings through which ink can be ejected. These ejection openings are arranged in lines in a direction intersecting with the transportation direction shown by the arrow X (a direction orthogonal to the transportation direction in this example). The respective ejection opening lines have a length corresponding to the width of a printed image and are arranged along the transportation direction shown by the arrow X.

Figure 14:
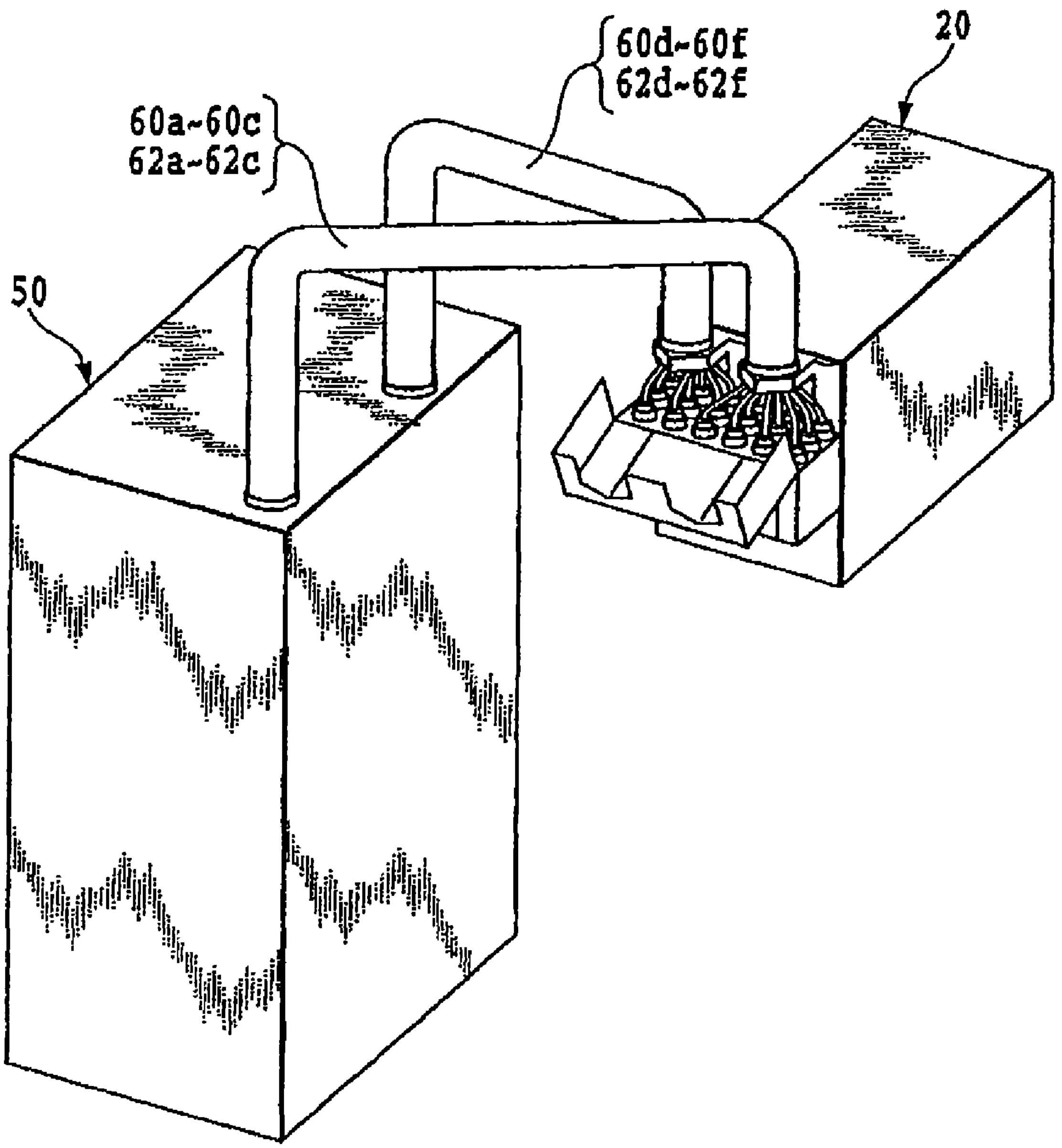
FIG. 14 is a perspective view illustrating a print module installed in the printing apparatus of FIG. 12.

When an image is printed, with the transportation of the pressure-sensitive adhesive sheet 100, black ink is ejected in an order of the respective printing heads K1 to K6 positioned at the upstream side in the transportation direction (i.e., in an order of the printing heads K6, K5, K4, K3, K2, and K1). The ink supply unit 50 is positioned to be away from the printing head unit 20 among which the ink supply tubes 60*a* to 60*f* and the ink regression tubes 62*a* to 62 are connected as described above (see FIG. 14).

FIG. 15 illustrates ink flow paths in the printing head unit 20 and the ink supply unit 50. FIG. 15 typically shows the ink flow paths between the printing head K1 and the tanks (the sub tanks 52*a* and the ink tank 35*a*) corresponding to the printing head K1. The same structure applies to other ink flow paths of the printing heads K2 to K6.

The ink tank 53*a* storing therein black ink is connected via an ink suction tube 56 to the sub tank 52*a*. At a middle position of the ink suction tube 56, a suction pump 58 is provided to suck the ink in the ink tank 53*a* to send ink into the sub tank 52*a*. For example, valves 81 and 85 are closed and valves 82, 83, and 84 are opened to drive the suction pump 58 to suck ink in the ink tank 53*a* at the left side of FIG. 15 to send ink into the sub tank 52*a*. The two ink tanks 53*a* are provided so as to prevent ink shortage during a printing operation. Thus, when ink in one of the ink tanks 53*a* is depleted, the valves 83, 84, 85, and 86 can be appropriately switched to connect the ink suction tube 56 to the other ink tank 53*a*. The valves 84 and 86 are an atmospheric pressure valve in order to introduce the atmospheric pressure into the ink tanks 53*a*.

The interior of the sub tank 52*a* is connected to an air communication hole 88*a*. The valve 88 is opened to allow the interior of the sub tank 52*a* to communicate with outside air to provide the atmospheric pressure. The sub tank 52*a* is attached with an ink level sensor (fluid level detection sensor) 51 including electrodes 51*a*, 51*b*, and 51*c* in order to detect the existence of ink therein and the ink level. Based on a change in the resistance among these electrodes 51*a*, 51*b*, and 51*c*, the existence of ink is detected and the suction pump 58 and the valve are controlled so as to always provide a fixed ink level in the sub tank 52*a*. The sub tank 52*a* and the printing head K1 are positioned so that a difference in the ink hydraulic head is used to apply an optimal negative pressure to the ink ejection opening of the printing head K1.

The sub tank 52*a* and the printing head K1 are connected with the ink supply tube 60*a* and the ink regression tube 62*a* so that ink can circulate between the sub tank 52*a* and the printing head K1.

Specifically, the sub tank 52*a* is connected to the ink supply tube 60*a* via an ink supply pump 59. The ink supply pump 59 is driven to pressurize the ink in the sub tank 52*a* to supply ink to the printing head K1. The valve 87 is opened to return ink in the printing head K1 to the sub tank 52*a* via the ink regression tube 62*a*. At the lower part of the printing head K1, the recovery unit 22 is positioned. Ink supplied to the printing head K1 through pressurization is pushed out from the ejection opening by the closed valve 87 and is received by a cap of the recovery unit 22. The recovery unit 22 is connected to the sub tank 52*a* via an ink collection tube 57 and a part of an ink suction tube 56. Thus, the valve 82 is closed and the valve 81 is opened to drive the suction pump 58 so that the sub tank 52*a* collects the ink received in the cap of the recovery unit 22.

The following section will describe an initial ink filling operation to fill ink, when the line printer 10 is newly provided, from the respective ink tank 53*a* or the like to the respective printing heads K1 to K6.

The initial ink filling operation is carried out when the line printer 10 is in an initial startup status. When the line printer 10 is in the initial startup status, the sub tank 52*a*, the ink suction tube 56, the ink supply tube 60*a*, the ink regression tube 62*a*, and the printing head K1 include therein no ink at all. In the initial ink filling operation, an operation to fill ink in the sub tank 52*a*, the ink supply tube 60*a*, and the ink regression tube 62*a* or an operation to fill ink only in the sub tank 52*a* is carried out.

The operation to fill ink in the sub tank 52*a*, the ink supply tube 60*a*, and the ink regression tube 62*a* causes, prior to the supply of ink from the sub tank 52*a* to the printing head K1, a not-connected status between the ink supply tube 60*a* and the printing head K1. In this not-connected status, the sub tank 52*a* and the ink supply tube 60*a* are filled with ink from a main tank 53*a*. Thereafter, the ink supply tube 60*a* is connected to the printing head K1 to supply the ink in the ink supply tube 60*a* to the printing head K1. An ejection opening face of the printing head K1 on which the ink ejection openings are formed is wiped by a cleaning blade (not shown) after the completion of the ink initial filling operation to wipe off the ink attached to the ejection opening face.

When the ink supply tube 60*a* and the printing head K1 are caused to be in the not-connected status to fill ink in the ink supply tube 60*a*, one end 60 at of the ink supply tube 60*a* is directly or indirectly connected to one end 62 at of the ink regression tube 62*a*. Then, the ink supply pumps 58 and 59 are driven to circulate ink from the main tank 53*a* through the sub tank 52*a*, the ink supply tube 60*a*, and the ink regression tube 62*a*. This allows air existing in the ink supply tube 60*a* to be exchanged with ink to fill ink in the ink supply tube 60*a*. Thereafter, the connection between the ink supply tube 60*a* and the ink regression tube 62*a* is cancelled to connect the ink supply tube 60*a* to the printing head K1 to supply ink in the ink supply tube 60*a* to the printing head K1. Thus, no air is introduced from the ink supply tube 60*a* into the printing head K1.

Thus, when ink is pushed out from the ink ejection opening of the printing head K1 into the cap of the recovery unit 22, ink is prevented from being pushed out together with a great amount of air bubbles. Thus, ink leakage from the cap can be prevented. Alternatively, the initial ink filling operation as described above also can be carried out by filling ink from the ink tank 53*a* only to the sub tank 52*a*. In this case, the valves 81 and 87 are closed and the valve 82 is opened to drive the suction pump 58.

Figure 16:
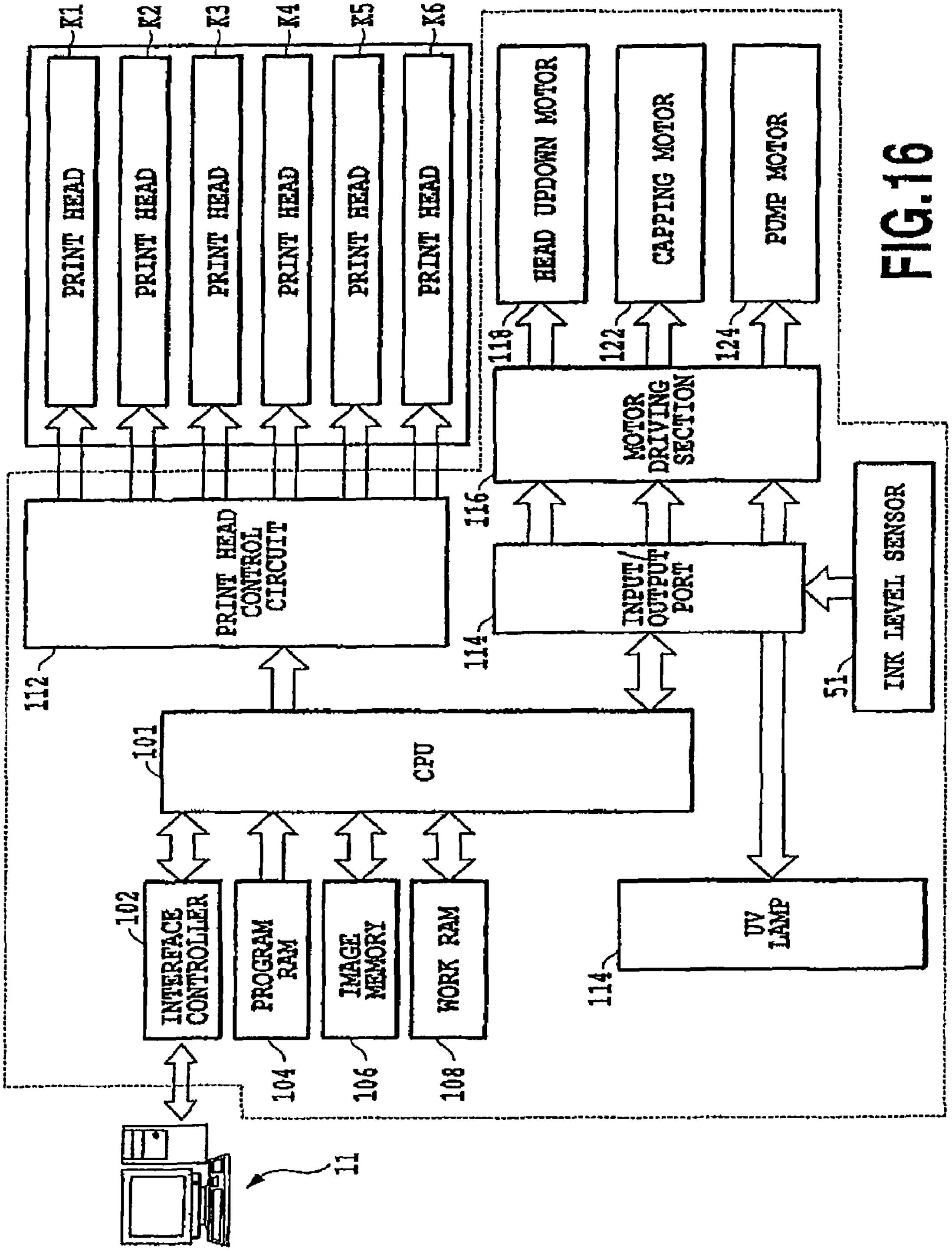
FIG. 16 is a block diagram illustrating a control system of the printing apparatus of FIG. 12.

FIG. 16 is a block diagram illustrating the control system of the line printer 10. This control system is accommodated in the print module as described above.

Printing data or a command sent from a host PC (host apparatus) 11 to a control system of FIG. 16 is received a CPU 101 via an interface controller 102. The CPU 101 is a computation processing apparatus that carries out the entire control in the line printer 10 such as the reception of the printing data and the printing operation or the like. The CPU 101 analyzes the received command to subject the image data of the respective color components of printing data to a bit map development in an image memory 106 to draw the image. The image memory 106 is used as an image development section.

Prior to the printing operation, a capping motor 122 and a head up-down motor 118 are firstly driven via an input/output port 114 and a motor driving section 116 to move the respective printing heads K1 to K6 from the cap of the recovery unit 22 to move the respective printing heads K1 to K6 to the printing position (image formation position). Thereafter, in order to determine a timing at which the ejection of ink to the transported pressure-sensitive adhesive sheet 100 is started (printing timing), a tip end detection sensor provided at a fixed position of the line printer 10 (not shown) is used to detect the tip end position of the pressure-sensitive adhesive sheet 100. Thereafter, the CPU 101 sequentially reads, based on an output signal from the encoder roller 47 (see FIG. 12), the printing data of the corresponding color from the image memory 106 in synchronization with the transportation of the pressure-sensitive adhesive sheet 100. Then, the read printing data is transferred via a printing head control circuit 112 to the respective corresponding printing heads K1 to K6.

The operation of the CPU 101 is carried out based on a processing program stored in the program ROM 104. The program ROM 104 stores therein a processing program corresponding to the control flow and a table or the like. A work RAM 108 is used as an operation memory. In the cleaning operation and the recovery operation of the respective printing heads K1 to K6, the CPU 101 drives the pump motor 124 via the input/output port 114 and the motor driving section 116. As a result, ink in the respective printing heads K1 to K6 can be pressurized to discharge ink through the ejection opening or to suck and discharge ink through the ejection opening to maintain the favorable ink ejection status of the respective printing heads K1 to K6.

An image is printed on the pressure-sensitive adhesive sheet 100 based on a printing horizontal synchronization signal in synchronization with the transportation of the sheet. Then, the printing data of one image is divided and the divided pieces of data are allocated to the six printing heads K1 to K6, respectively so that the one image is printed through the cooperation by the six printing heads K1 to K6. Specifically, the printing data is divided to pieces of data in a raster direction (raster division) to allocate the pieces of data to the printing heads K1 to K6. For example, the printing data corresponding to one raster allocated to the printing head K1 is sent from the image memory 106 from the printing head control circuit 112 in synchronization with a timing at which the position of the pressure-sensitive adhesive sheet 100 to be printed with the printing data is opposed to the printing head K1. Then, based on the printing data corresponding to the one raster, ink is ejected from the printing head K1. This also applies to other printing heads K2 to K6.

In the case of this example, the six printing heads K1 to K6 through which the same ink is ejected are provided. Thus, the printing data is allocated to the respective printing heads K1 to K6 for each raster or for a plurality of rasters. As a result, when compared with a case where one printing head is used, a six-times-higher printing speed can be theoretically achieved at maximum. A plurality of printing heads that can eject different inks also can be provided as a printing head. In this case, with regards to a plurality of printing heads that eject the same ink, the printing data can be subjected to the raster division as in the above-described case.

(Example of Preparation of Aqueous Dispersion Element of Carbon Black)

The following section will describe a specific example of the preparation of black ink. Hereinafter, any terms including "parts" and "%" are based on the mass standard.

First, 80 parts of potassium hydroxide solution (neutralization rate of 110%, resin solid content of 15 parts) of styrene/acrylic acid/butyl acrylate copolymer (acid number 150, weight average molecule amount 1100) is dissolved by 7 parts of diethylene glycol. This solution was added with 15 parts of carbon black to subsequently use a sand mill to disperse the solution to prepare the aqueous dispersion element of carbon black. This aqueous dispersion element showed a solid content density of 14.5% and an average particle diameter of 110 nm. The average particle diameter was measured by a dynamic light scattering method (laser particle diameter analysis system PARIII, Otsuka Electronics, Co., Ltd.).

The following section will describe specific examples of the composition of the aqueous ink prepared by the above aqueous dispersion element (Illustrative Embodiments 1 and 2 and Comparison Examples 1 and 2). The following section also will describe an image printing method, ultraviolet irradiation conditions, the evaluation result of the exposure level of the convex section of the pressure-sensitive adhesive layer, the evaluation result of the image curing, and the evaluation result of ink offset when these aqueous inks are used.

(Specific Example of Composition of Aqueous Ink)

Illustrative Embodiment 1

The above carbon black aqueous dispersion element (solid content of 14.5%) of 30.0 parts Water-soluble ultraviolet curing resin monomer (methacrylic acidhydroxy propyl) of 5.0 parts Water-soluble ultraviolet cure resin oligomer (pentaerythritol diacrylate-base oligomer) of 7.0 parts Photopolymerization initiator (IRUGACURE 2925, Chiba Special Chemicals) of 4.0 parts Acetylenol E100 (Kawaken Fine Chemicals Co., Ltd.) of 1.0 parts Rest of ion-exchange water The above compositions were mixed and were agitated for two hours. Then, the mixture was filtered by a 3 μm membrane filter to remove impurities to prepare ink.

Illustrative Embodiment 2

The ink was prepared in the same manner as in Illustrative Embodiment 1 except for that Acetylenol E100 of Illustrative Embodiment 1 was added with an additive amount of 3.0 parts.

Comparison Example 1

The ink was prepared in the same manner as in Illustrative Embodiment 1 except for that Acetylenol of Preparation Example 1 was deleted.

Comparison Example 2

The ink was prepared in the same manner as in Illustrative Embodiment 1 except for that ethylene glycol monobutyl ether of 5.0 parts and glycerin of 5.0 parts were added instead of the water-soluble the ultraviolet curing monomer, the water-soluble ultraviolet curing oligomer, and the photopolymerization initiator of Illustrative Embodiment 1.

The ink surface tension of Preparation Examples 1 and 2 and Comparison Examples 1 and 2 as described above were measured by the plate method using an automatic surface tensiometer (platinum plate) under an environment of 25 degrees C. The measurement results of the samples were as shown in following Table 1.

TABLE 1

| | Illustrative Embodiment 1 | Illustrative Embodiment 2 | Comparison Example 1 | Comparison Example 2 |
|---|---|---|---|---|
| Surface tension (mN/m) | 28.0 | 25.3 | 53.2 | 26.8 |

(Image Printing Method)

A printer BJ S600 marketed by Canon Inc. was used to use a pressure-sensitive adhesive printing sheet POSTEX (made by TOPPAN FORMS CO., LTD.) and the inks of the above Illustrative Embodiments 1 and 2 and Comparison Examples 1 and 2 to print a solid image with 100% duty. Thereafter, the images were irradiated with ultraviolet light based on the following conditions. Since the ink of Comparison Example 2 does not have an ultraviolet curing function, the printed image by the ink was not irradiated with ultraviolet light.

(Ultraviolet Irradiation Conditions)

Irradiation apparatus; F300S (made by FUSION UV SYSTEMS)

Power source unit P300M, illuminator unit 1300M

Lamp: FUSION UV model F305 ultraviolet lamp (using electrodeless lamp valve “D”, lamp power 120 W/cm)

Irradiation time: 1 second

Irradiation timing: 10 seconds after image formation (Evaluation of Exposure Level of Convex Section of Pressure-Sensitive Adhesive Layer)

The inks of Illustrative Embodiments 1 and 2 and Comparison Examples 1 and 2 were used to print images based on the above printing method. The resultant images were visually evaluated for a timing before the ultraviolet irradiation based on the above irradiation conditions and a timing after the ultraviolet irradiation based on the above irradiation conditions. As shown below, the evaluation before the ultraviolet irradiation was carried out based on three levels (○, □, and x) the evaluation after the ultraviolet irradiation was carried out based on two levels (○ and x). The printed image by the ink of Comparison Example 2 was not irradiated with ultraviolet light and was subjected to the same evaluation. These evaluation results were as shown in Table 2 below.

<Before Ultraviolet Irradiation>

○: Exposed convex section can be clearly visually recognized.

Δ: Although a convex section is covered by ink, no raised portion is found in the image.

x: The convex section is covered by ink and a raised portion can be visually recognized in the image.

<After Ultraviolet Irradiation>

○: An exposed convex section can be clearly visually recognized.

x: A convex section is covered by ink and a raised portion can be visually recognized in the image.

(Evaluation of Image Curing)

The inks of Illustrative Embodiments 1 and 2 and Comparison Examples 1 and 2 were used to use the above printing method to print images. The images were irradiated with ultraviolet light under the above irradiation conditions. Immediately after the irradiation and after 5 seconds after the irradiation, the images were touched by a finger to check the drying status of the images (tackiness, ink adherence to finger). The evaluation of the image curing as described above was carried out based on three levels (○, Δ, and x) as shown below. The printed image by the ink of Comparison Example 2 was subjected to the same evaluation without being irradiated with ultraviolet light. The evaluation result of the images are as shown in Table below.

○: No tackiness immediately after ultraviolet irradiation and no ink adherence to a finger.

Δ; Slight tackiness was found after 5 seconds after the ultraviolet irradiation but the pressure-sensitive adhesive sheet and the ink do not adhere to the finger.

x: Strong tackiness was found after 5 seconds after ultraviolet irradiation and the pressure-sensitive adhesive sheet and the ink adhere to the finger or is not yet dried.

(Evaluation of Ink Offset)

The pressure-sensitive adhesive layer of the pressure-sensitive adhesive sheet on which an image has been printed based on the above printing method and ultraviolet has been irradiated under the above irradiation conditions was opposed to and abutted to the pressure-sensitive adhesive layer of the pressure-sensitive adhesive sheet not printed with an image. Then, these sheets were compressed and peeled from each other. Then, the peeled sheets were visually evaluated with regard to the image transfer (ink offset). The evaluation of the ink offset as described above was carried out based on the three levels (○, Δ, and x). The evaluation result of the sheets is as shown in Table 2 below. The image printed by the ink of Comparison Example 2 was left and dried in a room (in RH at 25 degrees C.) for 20 minutes or more after the image printing. However, the image printed by the ink of Comparison Example 2 was not yet dried and was still sticky and thus could not be evaluated with regard to the ink offset.

○: No image transfer was found on the surface of the opposed and abutted pressure-sensitive adhesive layer.

Δ: The surface of the opposed and abutted pressure-sensitive adhesive layer is slightly blackened to show a slight image transfer.

x: The transfer of the solid image is clearly found on the surface of the opposed and abutted pressure-sensitive adhesive layer.

TABLE 2

| | | Illustrative Embodiment 1 | Illustrative Embodiment 2 | Comparison Example 1 | Comparison Example 2 |
|---|---|---|---|---|---|
| Exposure level of convex section | Before UV irradiation | ○ | ○ | x | ○ |
| | After UV irradiation | ○ | ○ | x | ○ |
| Image curing | | ○ | ○ | Δ | x |
| Ink offset | | ○ | ○ | x | — |

Other Embodiments

As described above, according to the present invention, when liquid ink is applied to the pressure-sensitive adhesive layer including minute concave sections and convex sections of the pressure-sensitive adhesive sheet to print an image, the amount of the applied ink is specified. Specifically, the liquid ink is applied to the pressure-sensitive adhesive layer and is cured so that the convex section of the pressure-sensitive adhesive layer is exposed out of the cured ink, thereby printing an image.

Under the conditions as described above, the present invention may apply liquid ink to cure the ink so that the convex section of the pressure-sensitive adhesive layer is exposed out of the cured ink. Thus, the ink type and the curing method may be selected appropriately. For example, aqueous ink or oil-based ink can be used and energy line or heat other than ultraviolet or the like also can be used to cure ink. Similarly, the ink application means is not limited to a configuration using the inkjet printing head and various ink application methods can be used. Similarly, the inkjet printing head also can use various methods to eject ink using an electrical thermal converter (heater) or a piezo element or the like. When the electrical thermal converter is used, the generated heat can be used to foam ink to use the foaming energy to eject ink through the ink ejection opening.

The image printing method also may be a so-called serial scan method to repeat printing operations by scanning the printing head in the main scanning direction and a transportation operation to transport the pressure-sensitive adhesive sheet as a printing medium in a direction intersecting with the main scanning direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-123583, filed May 8, 2007, which is hereby incorporated by reference herein in its entirety.

What is claimed is:

1. A printing method for applying liquid ink to a pressure-sensitive adhesive layer of a pressure-sensitive adhesive sheet to print an image, where a surface of the pressure-sensitive adhesive layer, to be superposed, includes a plurality of concave sections and a plurality of convex sections and is configured to adhere to another pressure-sensitive adhesive sheet, when superposed to each other, in a peelable manner, and the liquid ink is an active energy line-curable ink that cures by an active energy ray, the printing method comprising the steps of:

printing the image by applying the liquid ink to a printing region on the surface of the pressure-sensitive adhesive layer to be superposed; and curing the applied liquid ink, applied to the pressure-sensitive adhesive layer, by irradiation by the active energy ray, such that the liquid ink cures in the concave sections and tops of the convex sections in all areas of the printing region are exposed, wherein the applied liquid ink has a 10%-to-70% reduced thickness when cured.

2. The printing method according to claim 1, wherein the active energy ray is an ultraviolet ray.

3. The printing method according to claim 1, wherein a surface of the pressure-sensitive adhesive layer not yet printed with an image has a ten point average roughness (Rz) in a range from 30 μm to 100 μm at a cutoff value of 0.8 mm, and when it is assumed that the pressure-sensitive adhesive layer already printed with the image has the ten point average roughness of (Rz'), a ratio (Rz'/Rz) is in a range from 0.3 to 0.9.

4. The printing method according to claim 1, wherein the liquid ink is aqueous ink.

5. The printing method according to claim 1, wherein the liquid ink is ink not absorbed by the pressure-sensitive adhesive layer.

6. The printing method according to claim 1, wherein the pressure-sensitive adhesive layer is configured to be superposed and pressurized to adhere to the another pressure-sensitive adhesive layer in a peelable manner.

7. The printing method according to claim 1, wherein the liquid ink is applied using an inkjet printing head.

8. The printing method according to claim 1, further comprising a step of printing the image on at least one of a surface of the pressure-sensitive adhesive sheet on which the pressure-sensitive adhesive layer is not formed or a surface of the pressure-sensitive adhesive sheet on which the pressure-sensitive adhesive layer is not yet formed.

9. The printing method according to claim 1, wherein a level at which the convex sections of the pressure-sensitive adhesive layer are exposed out of the cured ink is adjusted in accordance with an amount of the applied liquid ink.

* * * * *

UNITED STATES PATENT AND TRADEMARK OFFICE

CERTIFICATE OF CORRECTION

PATENT NO. : 8,246,157 B2
APPLICATION NO. : 12/114386
DATED : August 21, 2012
INVENTOR(S) : Yoshiyuki Shino et al.

It is certified that error appears in the above-identified patent and that said Letters Patent is hereby corrected as shown below:

ON THE TITLE PAGE [73] ASSIGNEE:

"Canon Kabushiki Kaisha, Tokyo (JP)" should read --Canon Finetech Inc., (Misato-shi (JP)--.

Signed and Sealed this
Eighteenth Day of December, 2012

David J. Kappos
*Director of the United States Patent and Trademark Office*